(12) United States Patent
Belyaev et al.

(10) Patent No.: US 9,113,208 B2
(45) Date of Patent: Aug. 18, 2015

(54) PERSONALIZED VIDEO CHANNEL CONTROL

(71) Applicants: Leonid Belyaev, Moscow (RU); Igor Sokolov, Tver (RU); Ilya Baronshin, Saint Petersburg (RU)

(72) Inventors: Leonid Belyaev, Moscow (RU); Igor Sokolov, Tver (RU); Ilya Baronshin, Saint Petersburg (RU)

(73) Assignee: SQUAREDON CO LTD, Larnaca (CY)

( * ) Notice: Subject to any disclaimer, the term of this patent is extended or adjusted under 35 U.S.C. 154(b) by 0 days.

(21) Appl. No.: 13/846,645

(22) Filed: Mar. 18, 2013

(65) Prior Publication Data
US 2014/0282656 A1   Sep. 18, 2014

(51) Int. Cl.
| | |
|---|---|
| H04N 21/458 | (2011.01) |
| H04N 21/25 | (2011.01) |
| H04N 21/2665 | (2011.01) |
| H04N 21/475 | (2011.01) |
| H04N 21/45 | (2011.01) |
| H04N 21/462 | (2011.01) |
| H04N 21/24 | (2011.01) |
| H04N 21/258 | (2011.01) |
| H04N 21/414 | (2011.01) |

(52) U.S. Cl.
CPC ........... *H04N 21/458* (2013.01); *H04N 21/251* (2013.01); *H04N 21/25841* (2013.01); *H04N 21/2665* (2013.01); *H04N 21/4532* (2013.01); *H04N 21/4622* (2013.01); *H04N 21/475* (2013.01); *H04N 21/4751* (2013.01); *H04N 21/4755* (2013.01); *H04N 21/2407* (2013.01); *H04N 21/25816* (2013.01); *H04N 21/25875* (2013.01); *H04N 21/41407* (2013.01)

(58) Field of Classification Search
CPC ............ H04N 21/458; H04N 21/4532; H04N 21/475; H04N 21/4751; H04N 21/4755
See application file for complete search history.

(56) References Cited

U.S. PATENT DOCUMENTS

| | | | |
|---|---|---|---|
| 5,005,084 A | | 4/1991 | Skinner |
| 5,168,372 A | * | 12/1992 | Sweetser .................... 725/29 |
| 6,025,869 A | | 2/2000 | Stas et al. |
| 6,426,705 B1 | | 7/2002 | Wischoeffer |
| 2002/0056119 A1 | * | 5/2002 | Moynihan .................. 725/87 |
| 2003/0066090 A1 | * | 4/2003 | Traw et al. ................. 725/114 |
| 2006/0123455 A1 | * | 6/2006 | Pai et al. ..................... 725/133 |

(Continued)

FOREIGN PATENT DOCUMENTS

WO         99/44361 A1     9/1999

*Primary Examiner* — Robert Hance
(74) *Attorney, Agent, or Firm* — Amin, Turocy & Watson, LLP

(57) ABSTRACT

Video content is identified by a source component via a processor from a plurality of media sources. The media sources can comprise a wireless broadcast media channel, a web site, a web data feed, and/or a wired broadcast channel for communication via a personalized video channel. A profile component can determine user profile data that includes user preferences associated with a first client device for the video content and the plurality of media sources. A control component can generate a set of viewing controls associated with the user profile data that control transmission of the video content via the personalized video channel. A streaming component is configured to communicate the set of predicted video content from the plurality of media sources to a mobile component via the personalized video channel based on the set of viewing controls and the user profile data. The personalized video channel can be re-configured to communicate, at different times, the video content identified from different media sources of the plurality of media sources.

37 Claims, 17 Drawing Sheets

(56) References Cited

U.S. PATENT DOCUMENTS

| | | |
|---|---|---|
| 2007/0150918 A1 | 6/2007 | Carpenter et al. |
| 2008/0222689 A1* | 9/2008 | Howcroft et al. ............. 725/110 |
| 2009/0328104 A1* | 12/2009 | Jones et al. .................... 725/46 |
| 2010/0162294 A1 | 6/2010 | Yin et al. |
| 2010/0162317 A1* | 6/2010 | Xu et al. ......................... 725/46 |
| 2012/0278899 A1 | 11/2012 | Mahan |
| 2014/0012978 A1* | 1/2014 | Moussavian et al. ......... 709/224 |

* cited by examiner

PERSONALIZED VIDEO CHANNEL CONTROL

TECHNICAL FIELD

The subject application relates to video content, and, in particular, to personalizing and controlling a personalized video channel.

BACKGROUND

Media content can consist of various forms of media and the contents that make up the different forms of media. For example, a film, video, movie or motion picture can comprise a series of still or moving images that are rapidly put together and projected onto/from a display. The video is produced by recording photographic images with cameras, or by creating images using animation techniques or visual effects. The process of filmmaking has developed into an art form and a large industry, which continues to provide entertainment to masses of people, especially during times of war or calamity.

Typical television or video programming provides a set programming schedule combining pre-set programming that is sequentially broadcast to a user via a particular channel. The user establishes what television programming, channel and the corresponding times that the programs are being broadcasted. The user is then able to select from among a set number of broadcast channels, programming and/or times for the video. As a result, the user relies on the taste of the broadcasting studio to provide interesting content, at available times and on available channels for viewing. If the content is not suitable, another broadcast channel is selected or the user can opt to find different television entertainment, such as a movie rental, paid programming, online streaming, and/or rely upon recording devices to store the video on a particular channel for later viewing. The above trends or deficiencies are merely intended to provide an overview of some conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects disclosed herein. This summary is not an extensive overview. It is intended to neither identify key or critical elements nor delineate the scope of the aspects disclosed. Its sole purpose is to present some concepts in a simplified form as a prelude to the more detailed description that is presented later.

Various embodiments for evaluating and communicating media content and/or media content portions corresponding to various media sources via a personalized video channel are described herein. An exemplary system comprises a memory that stores computer-executable components and a processor, communicatively coupled to the memory, which is configured to facilitate execution of the computer-executable components. The computer-executable components comprise a source component configured to identify video content from a plurality of media sources to communicate the video content from the plurality of media sources at different times respectively via a personalized video channel. A profile component is configured to determine user profile data that includes user preferences associated with a client device for the video content and the plurality of media sources. A control component is configured to generate a set of viewing controls associated with the user profile data that control transmission of the video content via the personalized video channel. A streaming component is configured to communicate the video content of the plurality of media sources at the different times respectively via the personalized video channel based on the set of viewing controls and the user profile data.

In yet another non-limiting embodiment, an exemplary method comprises identifying, by a system comprising at least one processor, video content from a plurality of media sources for configuring a personalized video channel. The method comprises identifying video content from a plurality of media sources to communicate the video content from different media sources of the plurality of media sources at different times respectively via a personalized video channel. User profile data is determined that comprises a set of user preferences for the video content and the plurality of media sources. A set of viewing controls is generated that is associated with the user profile data that control transmission of the video content via the personalized video channel. The video content is streamed via the personalized video channel based on the user profile data.

In still another non-limiting embodiment, an exemplary tangible computer readable storage medium comprising computer executable instructions that, in response to execution, cause a computing system including at least one processor to perform operations. The operations comprise identifying video content from media sources comprising at least two of a wireless broadcast media channel, a web site, a web data feed, a wired broadcast channel, or a video library. A set of user profile data is determined for configuring a personalized video channel in communication with a first client device. A set of viewing controls associated with a subset of user profile data of the set of user profile data sets a limit and monitors viewing of the video content via the personalized video channel at the first client device or a second client device. The operations include configuring the personalized video channel based on the set of user profile data to communicate the video content from the media sources at defined times.

The following description and the annexed drawings set forth in detail certain illustrative aspects of the disclosed subject matter. These aspects are indicative, however, of but a few of the various ways in which the principles of the various embodiments may be employed. The disclosed subject matter is intended to include all such aspects and their equivalents. Other advantages and distinctive features of the disclosed subject matter will become apparent from the following detailed description of the various embodiments when considered in conjunction with the drawings.

BRIEF DESCRIPTION OF DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
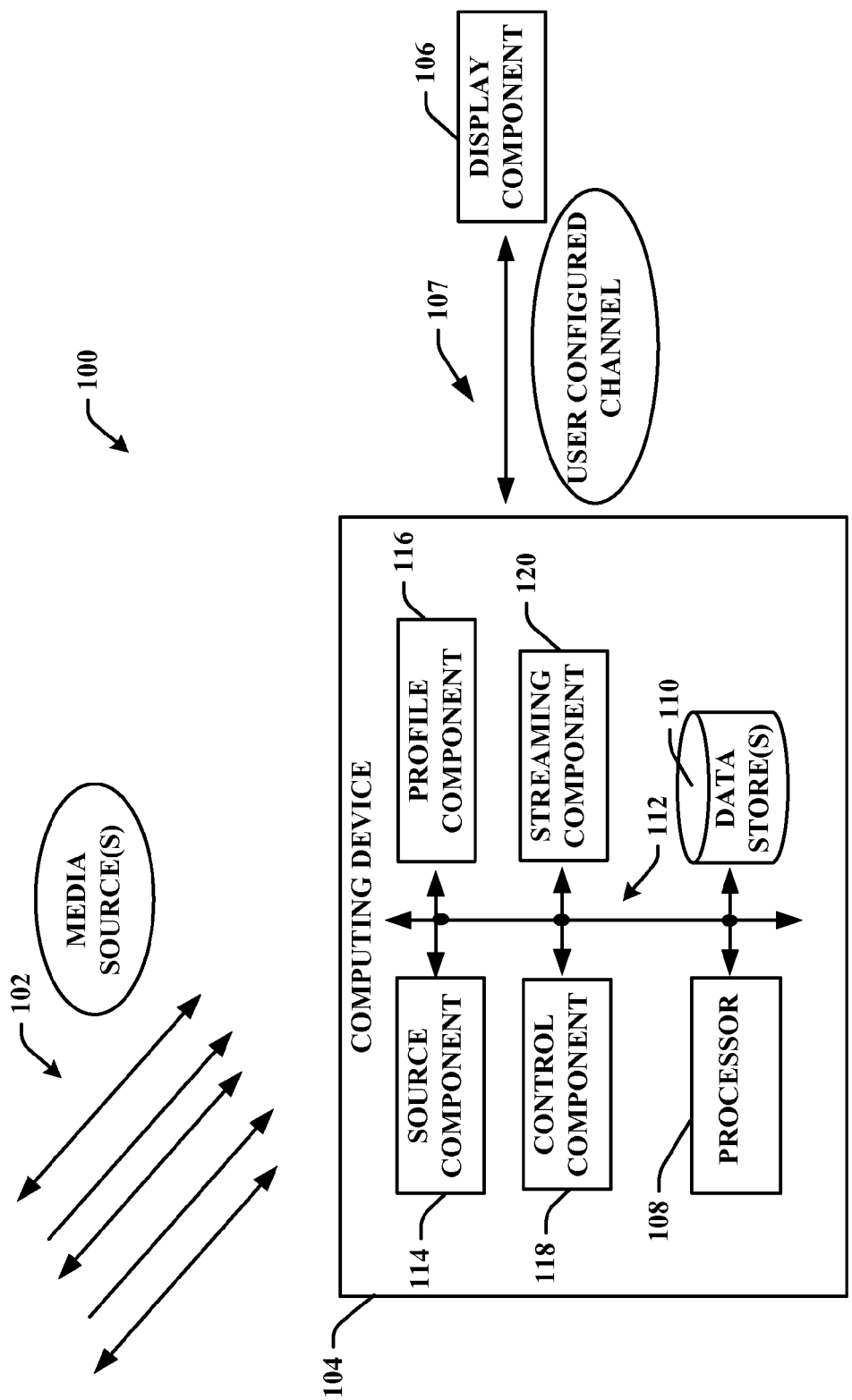
FIG. 1 illustrates an example system in accordance with various aspects described herein.

Embodiments and examples are described below with reference to the drawings, wherein like reference numerals are used to refer to like elements throughout. In the following description, for purposes of explanation, numerous specific details in the form of examples are set forth in order to provide a thorough understanding of the various embodiments. It will be evident, however, that these specific details are not necessary to the practice of such embodiments. In other instances, well-known structures and devices are shown in block diagram form in order to facilitate description of the various embodiments.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon such as with a module, for example. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements. The word "set" is also intended to mean "one or more."

Overview

In consideration of the above-described trends or deficiencies among other things, various embodiments are provided that aggregate video content into a single personalized communication channel and/or into multiple personalized channels that are configured independently according to user profile data, a subset or sub-profile data of the user profile data for one or more different users (e.g., children, friends, family), a user's likes and dislikes for timing, content and/or source of content for each personalized channel. For example, video content can be obtained from one or more media sources such as social networks, news feeds, web page feeds, broadcast networks, internet subscription services, etc., and aggregated for viewing as a single communication channel via a user device and/or a display component of a user device (e.g., a mobile device, a personal computing device and/or other video viewing device) based on user profile data and a set of user controls, which can be defined by at least part of authorized user profile data. The system operates to personally configure personal channels independently according to a user profile data and the set of user controls.

For example, parents like to have control over their children's electronic viewing and/or interaction with video content such as video gaming content and the like. This includes not only content that the children are allowed to watch, but also time the children area allowed to spend in from of TV. For those parents who desire to control what their kids are viewing, a second screen supervision functionality can be provided, for example, that gives parents a tool to limit a period of time or define a duration that their kids can spend watching TV and at the same time make it as less stressful for children as possible by introducing game mechanics within the user controls that dynamically interact with the children via the personalized viewing channel. Parents can also monitor or supervise viewing from another client device (e.g., mobile device, personal computing and/or other video viewing device). This enables features such as watching duration limitation, game mechanics that make it minimally unpleasant for children, and second screen supervision or monitoring. While the above example is provided for illustration with regards to parents, other circumstances can also enable user controls to monitor viewing of any additional user, subscriber and/or recipient of the personalized viewing channel to enable a user authorized to configure the personalized video channel to control sharing/publishing of the video content, the different media sources aggregated through the channel, and the schedule for additional viewers.

In one embodiment a sub-profile or a subset of the user profile data can be established that corresponds to one or more other users. For example a child's sub-profile can be created under a parents profile data. Parents that configure the personalized video channel can set a watching duration limitation (a timed duration), mark content that is inappropriate for their kids for blocking, and have real-time access from another device. Thus, when a child desires to watch video content, parents can switch a viewing device to a kids profile or maintain one device under (controlled by) one sub-profile configuration for the personalized video channel(s) and another device under another set of sub-profile data to be applied automatically. When the timed duration comes to an end, a set cartoon character, based on the interactive (gaming) control(s) set, can be communicated via a display component of the viewing/client device that screen that communicates that there is only one cartoon left, so many minutes, etc., and then the channel will be turned off or blocked for further viewing on the particular viewing device being used.

Personalized Video Channel Control

Referring to FIG. 1, illustrated is an example system 100 that generates a user configured video channel based on a user profile in accordance with various embodiments disclosed. System 100 can include a memory or data store(s) 110 that stores computer executable components and a processor 108 that executes computer executable components stored in the data store(s), examples of which can also be found with reference to other figures disclosed herein and throughout, such as the computer device 1712 of FIG. 17 and elsewhere. The system 100, for example, includes a computing device 104 that can include a mobile device, a smart phone, a laptop, personal digital assistant, personal computer, mobile phone, a hand held device, digital assistant and/or other similar device, which can include hardware and/or software communicating via a network, a wireless and/or wired transmission.

The computing device 104 operates to receive and aggregate multiple media sources 102 and/or media source streams, such as by address, user profile data, subscription service, network affiliation (e.g., network subscription, social network profile, blog feed, etc.), and corresponding content (e.g., news broadcast, television programming, web cast, web page feeds, personal data and other media content) into a single communication channel 107 to be rendered in a display component 106 for viewing by the user implementing the channel configurations and also by friends of other mobile devices that can interact for a community experience at scheduled broadcast times. The computing device 104 comprises various components that can operate and/or communicate via a network the user configured personalized video channel 107, wired and/or wireless communication channels, and the like. The computing device 104 comprises a source component 114, a profile component 116, a control component 118, and a streaming component 120 that can operate synergistically to obtain media content (e.g., video content) from various media sources, aggregate the media content via the processor 108 and data store(s) 110 and dynamically communicate the media content in response to user profile data via a single channel 107.

The source component 114 is configured to obtain video content from a set of media sources. The source component 114 operates, for example, to identify video content from a plurality of media sources comprising a wireless broadcast media channel, a web page, a web feed, and/or a wired broadcast for communication via the personalized video channel 107, examples of which can include social network feeds, programming feeds, news feeds, local channel digital/analog broadcasting over air, cable broadcasting, internet content, video rental/subscription services on the internet, and the like. The source component 114 can be hardware (e.g., a processor), and/or software that searches networked communications, wireless communications via an antennae receiver/transceiver device, wired communications (e.g., optical, two-wire, etc.), local broadcasting, network web feeds, news feeds, web page content, data store(s), and the like. For example, the source component 114 is configured to dynamically identify broadcasted content from local broadcasting stations of locally aired programming, identify cable broadcast for paid/unpaid programming, TV-guide and/or other scheduling resources that publish scheduling or video content information as it is updated as metadata, a separate web page connection, and/or broadcast communication. The source component 114 further operates to identify and receive Rich Site Summary for new feeds of updated page content from social networks, channel pages, and/or subscribed services for video, as well as identify any other media source that communicates individual, studio produced, network uploaded, etc., video content for viewing at user defined preference times with user defined sources on a user controlled channel.

Various video content or media content sources can be identified via the source component 114 utilizing a user profile (user profile data) generated by the profiling/profile component 116, such as by directing video content from a network address, receiving subscribed feed data, accessing user profiles through the profile data dynamically, local channel subscriptions, other video content subscriptions web sites or portals, personalized video libraries, wireless broadcast video content reception, cable streaming and the like. The profiling component 116 is configured to generate user profile data based on a set of user preferences related to the video content and/or a set of behavioral data. The user profile data, for example, can be from a user profile of a user that is generated. The user profile data can include login information, a user name, user personal data, authentication data, media source preferences, media content preferences, time preferences for video content/media sources, date preferences for video content/media sources and/or the like user preferences. The user preferences can further include a time preference to associate with the media content or video content and other classification criteria, such as a personalized channel selection, a theme preference for types of media content (e.g., Science Fiction, Drama, etc.), a rating preference (e.g., G rated films, five start films, etc.), an actor preference, a language preference (e.g., Spanish, Russian, English, etc.) and/or a date preference (e.g., release date, viewing dates, broadcast dates) pertaining to the personalized channel 107 for configuring and/or identified media sources for content via the source component 114 at one or more user defined scheduled times. The user profile data configured by the profiling component can further include classification criteria that include at least one of a theme, an age range, a media content rating, an actor or actress, a title, and the like metadata for identifying content, communicating media sources identified, and/or identifying updated media content of a media source and/or particular broadcast/upload/data store/feed stream.

In one embodiment, the user profile (data) generated by the profiling component 116 further comprises behavioral data that includes search data, viewing data, purchasing data, communicated data, each relating to ways the user of the user profile has interacted with video content as well as other user input controls related to video content (e.g., storage, viewing times, fast forwarding, skipping, replaying, search terms, and other input controls as related to video content). For example, if evidence of Minoan civilization in Northeast Michigan (5000 B.C.) is searched, the computing device 104 utilizes the components therein to define various videos related to this search data to establish media sources having similar or related content and provide configurable options to the user for generating a personalized dynamic channel for viewing on the display component 106 (e.g., a display screen, display device, etc.) on client device at various times that correspond with a newly broadcast programming, purchased programming, rented programming, web updated programming, subscription service programming, recorded programming stored and/or the like. For example, future viewing options can be communicated along with other metadata pertaining to the media content searched and the future viewing options can be programmed to view via the personalized channel 107 at the same time as the future scheduled viewing and/or stored for viewing at a another defined time. Therefore, a search engine (not shown) of the computing device 104 for video content of interest can be monitored or in communication with the profiling component 116 in order to dynamically present scheduling options, broadcast options, and/or media content/source options for a user to configure the channel 107. The search engine can be any search engine of a network (e.g., internet network) and/or a search engine provided in a browser (now shown) of the computing device and/or client component(s) display component 106.

The user can select to view, configure, purchase, subscribe and communicate any one of these content options on the channel 107 to the display component 106 of the system 100 as well as to other mobile devices of subscribing friends to the user's configured channel. The criteria for presenting options to configure the channel 107 can be further based on the user preferences. Although a user is not intending to search for video content, the configurable personalized channel 107 and the computing device 104 can further operate in an operating background to ascertain user interest and user behavior along with set preferences to provide catered options for viewing when the user is ready to interact with video format or, in other words, operate television viewing for him/herself.

The user can select to view, configure, purchase, subscribe and communicate any one of these content options on the channel 107 to a client/display component 106 of the system 100 as well as to other mobile devices of subscribing friends to the user's configured channel. The criteria for presenting options to configure the channel 107 can be further limited based on the user preferences. Although a user is not intending to search for video content, the configurable personalized channel 107 and the computing device 104 can further operate in an operating background to ascertain user interest and user behavior along with set preferences to provide catered options for viewing when the user is ready to interact with video format or, in other words, operate television viewing for him/herself.

The behavioral data or user profile data can further include age data, household membership data and/or subscription data. The age data can comprise the age range of the user corresponding to the user profile, which can be used to ascertain a profile of age interest based on other population samples of similar age and/or generational preferences for dynamically interacting with the user for providing options to configure the personalized channel viewing experience. Household membership data can include other members of the user's household or immediate family, which can be used to configure other channels for their viewing as appropriate. The subscription data can be the various online or offline subscriptions that a user patronizes. For example, magazine subscriptions, cable subscriptions, video subscriptions (e.g., movie rental online or offline, such as internet subscriptions to streaming or by mail DVD content), video subscription sites, web feeds (e.g., social network news feeds), and the like can be identified and accessed as video content options and media sources for assigning to the channel 107 at defined times, for defined content, and the like. For example, if the user defined Friday night as watching one set of video content on the channel 107 from one media sources at a certain time, another video content from another media sources could be subsequently viewed automatically via the channel 107. The content can be set to be communicated via the channel 107 from various sources that offer different content. The content can be monitored for updated content, in which the user can be notified of and then select any number of options to configure the channel 107.

In addition, the behavioral data can include viewing information that rates a user's interest level in a video feed from one or more of the media sources. For example, the personalized viewing channel 107 can comprise a set of controls for operating the video content, in which the controls can be communicated to the display component 106. Based on the controls selected during viewing the computing device 104 can further ascertain user interest in the video content and make further recommendations of video content accordingly. For example, the controls can include directional controls, rewind, forward (to return to a previous segment or fast forward to a next one or a different program and/or a different media source), up and down (for changing different channels and/or different media sources, depending upon the personalized configuration of the channel).

The profiling component 116 further operates to aggregate profiles or log in access to a set of social networks, video subscription services online and/or other video distribution services and provides an access key for aggregating videos or media content via the source component 114. The user can connect his user profile to multiple services for video and provide the viewing over an assigned channel that is configured. Additionally, the profiling component 116 can import RSS subscriptions to the profile, in which the system 100 can operate to import video content, add video content, and updated content and information into the selected personalized channel 107.

The control component 118 is configured to generate a set of viewing controls associated with the user profile data that control transmission of the video content via the personalized video channel 107. The set of viewing controls generated by the control component 118 can comprise a timed duration control to define a timed duration for receiving the video content via the personalized video channel, an interactive mechanic control to define an interactive mechanic that interacts with at least one client device while receiving the video content via the personalized video channel, and a monitoring control to monitor a viewing of the personalized video channel, for example. Additionally, the control component 118 can generate an authentication control for employing user authorization and authentication based on the user profile data and/or sub-profile data of the user profile data that corresponds to another client or user, and/or an additional client viewing device (e.g., a child's viewing or child's viewing device).

For example, the personalized video channel 107 is controlled with the set of user viewing controls via the control component 118 from a first mobile device 106 to set a timed duration and/or with other controls for receiving the video content at a second mobile device (not shown), or at the same device with display component 106 which is further detailed below. A parent or authority/owner associated with the user profile data of a client device/display component 106 can operate the control component 118 to set a setting, which can control a maximum time that personalized video channel 107 operates or streams video to the user (e.g., child, subscriber or other) of a client device for viewing. In response to the time interval (timed duration) expiring, the control component 118 can operate to switch the personalized video channel 107 to a "standby" mode or off, in which no content consumption is enabled, with a text message (and optional voice message) explaining to the user/viewer that the time limit is expired or will expire.

The control component 118 can also operate to set authorization and/or authentication controls that are associated with the user profile data (e.g., login data, a secure phrase, pin number, challenged response, inherence factor—biometric print, retinal scan, etc., and/or a two factor authentication). For example, a parent corresponding to the user profile data can enter a 4-digit pin code along with the required time interval for setting a timed duration of viewing associated with one or more other user/user device(s). The parent could also be enabled to cancel the time interval by accessing the setting/controls via entering or enacting the same security (e.g., pin code) or other security protocol comprising a one or more combinations of the user profile data and security examples above.

In addition, other controls of the control component 118 can be activated or set. For example, a user of the system 100 can avoid some particular content (associated with a parental rating, a time period in a day, genre, and/or from other classification criteria) for being viewed, such as from their children. The controls can become available for parents or a user with a user-generated pin code, for example. When this option becomes active, all such content (or any content in a particular time period) can require the pin code in order to be watched.

Another control that can be implemented via the control component 118 is a remote control or monitoring that can post, message and/or enable viewing of information about the video content and/or media source being watched. A notification can be provided via an electronic message (e.g., a text, email, and/or stored in the user's profile data to self-care pages of user profile data for a user account.

Parents, being away from the display component 106 or viewing client device can enter their user profile data to access their personalized video channel remotely and see what video content is being watched right now (by the users/client device of the sub-profile data) and from which device. The personal video channel 107 can be controlled via the control component 118 and can be forced to stop playback and enter a standby mode, in which no video content is communicated.

The streaming component 120 is configured to communicate the video content from the plurality of media sources 102 to the display component 106 (e.g., a display panel, a display device—mobile smart device, personal computing device, personal digital assistance, mobile device, processor device, etc.) based on the demographic data and user profile data generated by the computing device 104. The streaming component 120 is further configured to communicate the video content from different media sources of a plurality of media sources at different times based on the user profile. Further, the streaming component 204 can operate to communicate different video content from different media sources at the same time at different personalized channels 107, and/or at the same channel for interacting with one type of content and viewing another, such as video chat with various client devices while viewing the video content from media sources at the same time.

In another embodiment, the computing device 104 operates to stream video content via the streaming component 120 from various media sources at prescheduled timing, via dayparting with demographic data, and based on the user controls of the control component 118 as well as the user profile data with video content of media sources. The media sources can comprise at least two of a broadcast (wired/wireless), power line carrier signal, optical link, web feed, web link, a network, personal video library and/or the like. The user can set the content, times and media sources with user preferences and control the communication of the content through the personalized video channel(s). The computing device 104 can operate to recommend or suggest configurations (video content, scheduling, media source options) as selectable user viewing options based on the user preferences and/or behavioral data about the user that is learned from the system as part of the user profile data. In one example, cartoons from a video distribution site can be programmed for one time period and news video of a selected topic can be generated from different media sources at another time period (e.g., cnn videos, msn videos, etc. found to relate to sinkholes occurring in Florida). Additionally, other criteria or classifications can be programmed along with video content and various media sources in particular for different time slots based on the user's interest.

Figure 2:
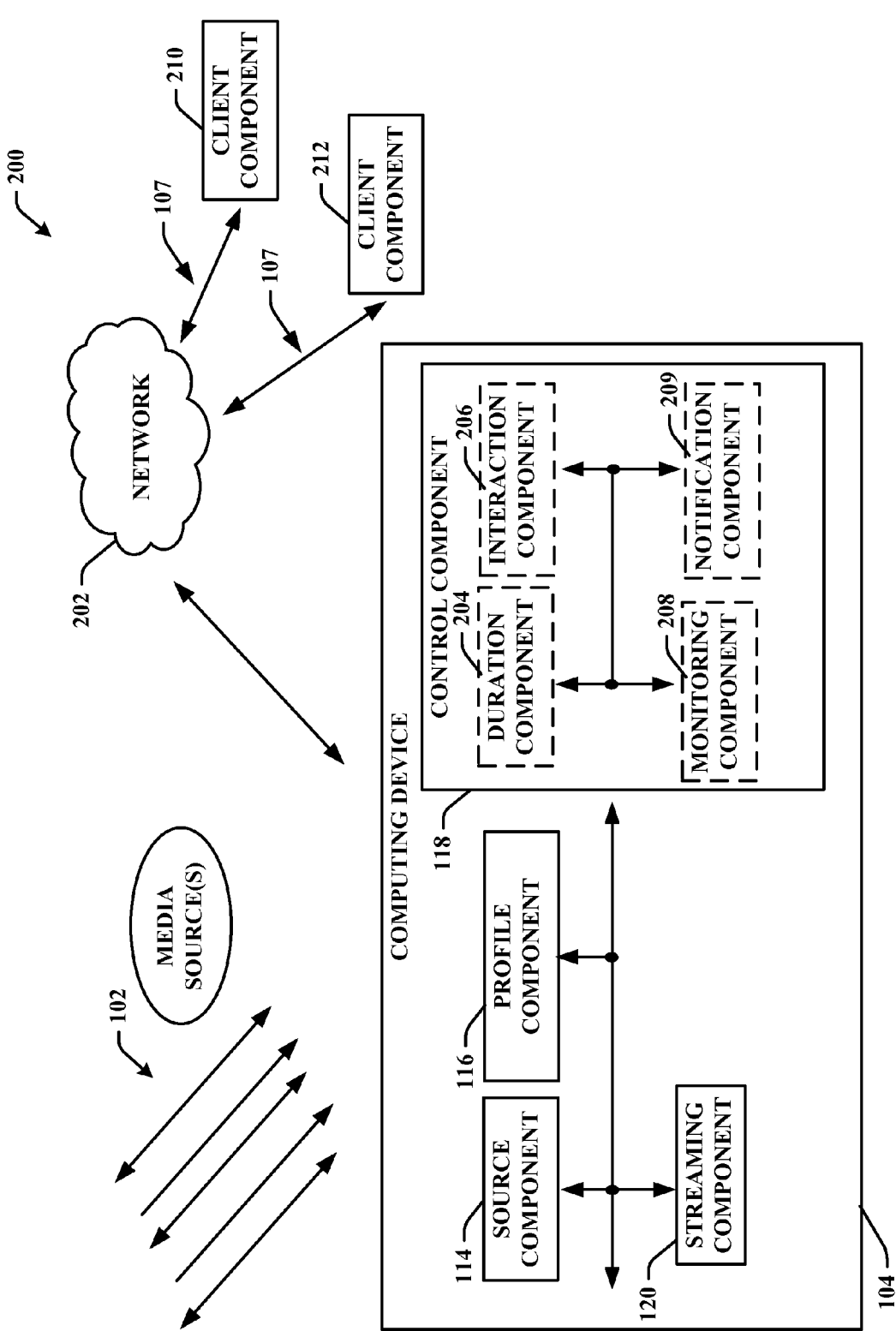
FIG. 2 illustrates another example system in accordance with various aspects described herein.

Referring to FIG. 2, illustrated is an example system 200 for generating personal media viewing in accordance with various embodiments described herein. The system 200 operates to obtain media content from media sources 102 such as from social networks, online news data feed, video services and other web pages/sites, and further aggregates the media sources into a personalized video/viewing channel 107 based on user profile data as well as a set of controls for regulating the personalized video channel 107. The personalized video viewing channel 107 operates as a configurable user video channel that can be configured by the computer device 104 to provide programming (e.g., video content, or other media content) as a series of personally scheduled content from various media sources that broadcast, post, feed update, upload, etc. programming for general viewing and/or subscribed viewing. The personalized video channel 107 can be configured based on user profile data identified by a user having corresponding user profile data and/or a user profile data account via the client component 210, for example. The personalized video channel 107 can be configured for particular programming, video content, and/or media sources to be communicated based on user preferences, user controls, and/or behavioral data learned that represents user inputs data related to the video content (e.g., purchasing video content, titles viewed, titles searched, content skipped or selected, content shared, etc.). The personalized video channel 107 can then operate to be subscribed to, viewed at certain times, and/or freely available to other client devices such as the client components 212, in which the client component 210 can control through user controls generated by the control component 118.

The system 200 can operate to communicate via one or more communication lines, via a network 202 (e.g., cloud network, local area network, wide area network, and the like), a wired connection, and/or a wireless connection with similar components, in which the control component 118 can comprises a duration component 204, an interaction component 206, a monitoring component 208 and a notification component 209. Although the control component 118 is illustrated as housing the duration component 204, the interaction component 206, the monitoring component 208 and the notification component 209, these components can be communicatively coupled within the system 200 as external and/or internal components in the network 202, the computing device 204 and/or the client component(s) 210 and/or 212.

The control component 118 operates to generate various user controls for operation and management of one or more personalized video channels 107 to one or more client components 210, 212. The control component 118, for example, can operate as a parental control mechanism, and/or as a configurable control mechanism for any secondary subscriber or user permitted by the primary user corresponding to the user profile data. For example, a user could configure a personalized video channel 107 based on a variety of likes and dislikes for video content, such as from media sources of online movies, personal video stores, broadcast networking, web cast, web feeds, video content distribution sites and the like.

While one person could configured a video channel to distribute video content from a variety of media sources into one channel one particular way, another user could do so another way via another channel based on user profile data, in which each user or primary user that is associated with and generates the user profile data, which embodies any sub-profiles therein for other user's or user devices and authorizes user controls. The controls generated by the control component 118 can thus operate to enable each user with a sub-profile data or sub-profile data account as part of the user profile data to configure a personalized channel 107 with settings that enable one or more other user's full access, limited access and/or no access to receive and be a part of the viewing audience of a particular configurable personalized video channel, such as the personalized video channel 107, for example.

In one embodiment, a duration component 204 is configured to generate a duration control to the personalized video channel 107, for example, that sets a timed duration for a second client device to receive the video content of the plurality of media sources. In addition or alternatively, the duration component 204 could be set to a same client device, but for a different user (e.g., a child), and/or set for differing times for different configurations of video content and media sources being communicated, in which multiple users can utilize the channel 107 from one device, such as a family television, for example, or family smart phone. A host or plurality of devices (e.g., client component 212) can also subscribe to the same personalized video channel 107 as configured and controlled by the primary user (e.g., client component 210), in which one user set of user profile data manages the account, or, in other words, is accounts for security, configuration and controls of the personalized video channel 107.

The duration component 204 is further configured to associate the timed duration to the personalized video channel 107 by the primary user or client component 210 for the second client device 212 or based on a set of sub-profile data of the user profile data. One or more sub-profile data sets or sets of subset user profile data can be associated with various different users/subscriber/recipients of video content/media sources via the personalized video channel 107. Various users can be associated with sub-profiles as part of a user profile data for a particular primary user/user device that creates the channel 107 from selected content options, scheduling options and user controls inputs. Various purposes can be achieved, in which user controls the channel 107, including child viewing monitoring as well as artistic forms of expression of interest, user publishing for real time companionship with others remotely for shared viewing and the like to be controlled.

For example, a family could receive the ability to configure a personalized video channel for a home to regulate and monitor use of the personalized video channel 107, in which children are controlled and monitored via the user controls among various devices or sub-profile data. The personalized video channel 107 can be published and enabled via a social network 202 to be configured with multiple various media sources as they are dynamically identified by the source component 114 across a network 202, airways, a wired connection (e.g., power line connections, cable connections, and the like), webcast, web feeds, subscription services, etc. and then enable the channel to be published so that other viewers/users can receive requests and accept request for other viewers to view the same configured video content from various media sources at the same times as the primary user has scheduled. The system 200 thus operates to set a duration limit, or a viewing time duration, in one example, so that the viewing of the personalized channel 107 is cut off, stopped, and/or put on stand-by to any one particular user, time slot of a day/date, and/or of a user device tuning into the personalized video channel 107 of the user.

The interaction component 206 is configured to interact with a client device viewing the personalized video channel 107 by an interactive mechanic that generates at least one of a voice, a video character or image, a text and/or a phrase via the personalized video channel. For example, the profiling component 116 obtains user profile data to configure the control component 118, which receives a user preference for generating a character, such as a cartoon character, a virtual character as a graphic simulation of the parent or the user, an avatar and/or some other embodied/interface agent that can be communicated via the personalized video channel 107 to one or more viewing client devices.

The interaction component 206 generates a notification of the timed duration set by the duration component to one or more client devices via the personalized video channel 107, such as from a programmed setting notification with the interactive mechanic from one device to another second device at a viewing time for the second device, at scheduled times on the same device, and/or via viewing times of the personalized viewing channel that are authorized through a sub-profile account of the user profile data. The interactive mechanic generated by the interactive component 206 can be set based on one or more virtual character characteristics and one or more criteria for interacting graphically via the personalized viewing channel 107. For example, the interactive mechanic can be governed or generated according to criteria that include at least one of a video game that generates an interaction with the client device, a video image character that generates at least one of the voice, a video image, and/or a text via the personalized video channel 107, as well as a symbol.

In one example, the interactive component generated can be configured to provide an indication that the timed duration is at an ending time for viewing via the personalized video channel. Therefore, if the timed duration is set for two hours each day, under a child's sub-profile data, then before the two hours is over, an avatar or graphical rendition of the parent, cartoon character, and/or other image can be displayed alongside, overlaying, and/or as a part of a viewing screen in order to communicate that the timed duration will be ending and along with any other additional message that has been set, such as "and you are also reminded to kiss your lovely mother goodnight." The interactive mechanic of the interaction component 206 can also request an interaction from the viewer of the channel 107, such as to press a remote control button, speak, press a touch screen of the display component of the client component 210, 212, for example, or some other acknowledgement that the message has been received by the viewer (e.g., the child). As another example, Mickey Mouse could appear on the screen of the user device to speak that "this will be all boys and girls, the viewing time is over, and the personalized video channel 107 is shutting down." Subsequently, the control component 206 can operate to block any further viewing content and enter in stand-by mode, sleep mode and/or some other viewing mode to prevent the user device, the user and/or the streaming of content for the sub-profile account and/or the particular device. As discussed above, the set of sub-profile data can comprise at least a part of the user preferences including at least one of a viewing time, an interactive mechanic preference (e.g., avatar, flashing, text phrase, etc.), a set of blocked media sources and/or a set of blocked video content for the a particular client device.

The monitoring component 208 is configured to enable a client device, such as client device 210 to access the personalized video channel 107 at a same time as a second client device, such as device 212 is accessing the personalized video channel 107. The monitoring component 208 is further configured to initiate the streaming component to communicate the video content to the first client device and the second client device so that two device can view the same content simultaneously. In addition or alternatively, the monitoring component 208 can record video content and/or metadata related to the video content being viewed by one or more user devices.

For example, one user device or user associated with a sub-profile data could view cartoons broadcasted locally, while another device could be viewing news. Rather than recording each show, or providing a simultaneous viewing of each show, the monitoring device could record video content titles, other data, and/or data about the media source for different times that the personalized channel 107 is being viewed. While the same content is streamed at the same time, different content can be viewed at different times by different devices in situations with multiple children in a home, and/or various subscribers/recipient users tuning into content from the personalized channel. For example, an aunt, uncle or other relative could view the channel of family videos at one time, and tune in at another for viewing news feed update data from a selected media source identified and scheduled for another particular time that is controlled by a duration time, notifications, blocked content, and/or further monitoring control.

The notification component 209 is configured to communicate a notification, for example, that indicates in a notification message at least one of a viewing duration, metadata pertaining to the video content communicated via the personalized video channel, the video content and/or a media source of the video content and/or metadata of the media source, which can be in association with a set of sub-profile data of the user profile data for a second device or a corresponding user authorization with the set of sub-profile data.

For example, the notification component 209 operates to generate a notification of a user device or sub-profile account of a child by generating an email, text, or other message to contact information of the user profile data. The notification can include a title of a video content, metadata related to video content viewed, and information about the media source being accessed and/or scheduled via the personalized video channel 107.

Figure 3:
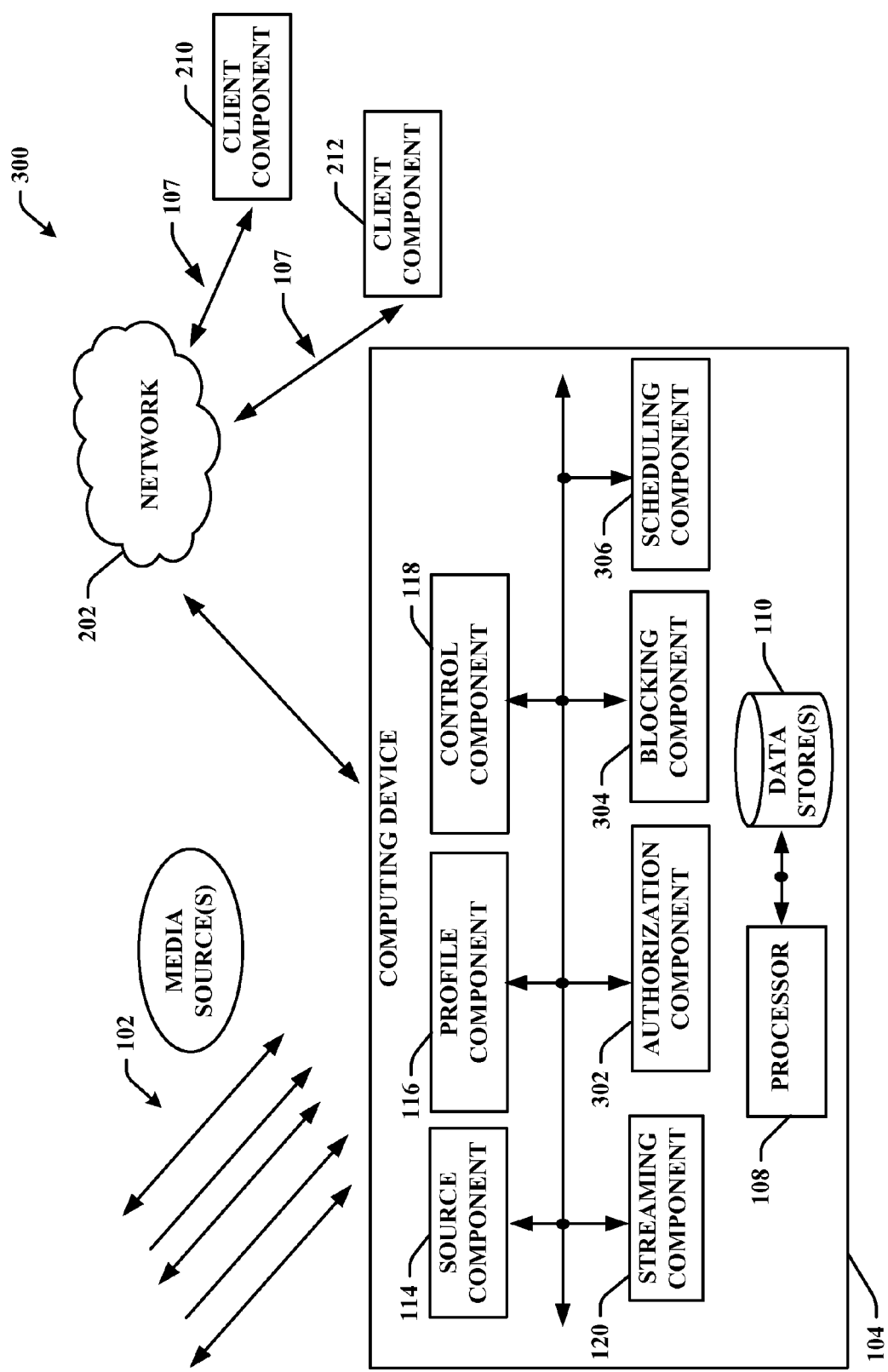
FIG. 3 illustrates another example system in accordance with various aspects described herein.

Referring to FIG. 3, illustrated is a system 300 for having parental controls or primary user controls in accordance with various embodiments described herein. The computing device 104 of the system 300 includes an authorization component 302 that authorizes the primary user, such as client component 210, to implement configurations of video content/media sources 102 and controls for the channel 107 via the control component 118. The computing device 104 further comprises a blocking component 304 and a scheduling component 306.

The authorization component 302 operates to provide access to the set of viewing controls and the user profile data. The set of viewing controls comprise a timed duration control to define a timed duration, an interactive mechanic control to define an interactive mechanic to interact with a second user other than the primary user or second user device, and/or a monitoring control to monitor a viewing of the personalized video channel. As discussed above, the set of viewing controls can include a sub-set of the user profile data associated with second user profile data and/or the second user device. The user profile data further includes a set of behavioral data representing user control inputs related to the video content that includes at least one of purchasing date, viewing data, search data, purchase data, location data, language data, age data, household membership data and/or subscription data for other subscription video services associated with the user profile data.

In one example, the authorization component 302 can provide security to the user controls of the control component 118 and for configuration of the channel 107 such as what video content is communication, from what media sources, at what times, for timed durations associated with a sub-profile data or other user device for viewing video content, interaction settings for an interactive mechanic to interact with a viewer, blocking content/media sources, and generating monitoring security of the personalized video channel 107 for the primary user of the user profile data overall.

For example, a parent can set timed durations by entering a pin to access settings for timed durations. The security implemented by the authorization component 302 can include a two factor authorization, a security question, a security number or pin, and the like. The authorization component 302 operates to set authorization and/or authentication controls (e.g., timed duration control, monitoring controls, blocking content, notification, interactive mechanic settings, etc.) that are associated with the user profile data (e.g., login data, a secure phrase, pin number, challenged response, inherence factor—biometric print, retinal scan, etc., and/or a two factor authentication). For example, a parent corresponding to the user profile data can enter a 4-digit pin code along with the required time interval for setting a timed duration of viewing associated with one or more other user/user device(s) as well as for the other controls of the channel 107. The parent could also be enabled to cancel the time interval by accessing the setting/controls via entering or enacting the same security (e.g., pin code) or other security protocol of the authorization component 302 comprising a one or more combinations of the user profile data and security examples above.

Various video content sources can be identified via the source component 114 utilizing a user profile (user profile data) generated by the profiling/profile component 120. The profiling component 116 is configured to generate user profile data based on a set of user preferences related to the video content and/or a set of behavioral data. The user profile data, for example, can be from a user profile of a user that is generated. The user profile data can include login information, a user name, user personal data, authentication data, media source preferences, media content preferences, time preferences for video content/media sources, date preferences for video content/media sources and/or the like user preferences, in which access is enabled via the authentication component 302. The user preferences can further include a time preference to associate with the media content or video content and other classification criteria, such as a personalized channel selection, a theme preference for types of media content (e.g., Science Fiction, Drama, etc.), a rating preference (e.g., G rated films, five start films, etc.), an actor preference, a language preference (e.g., Spanish, Russian, English, etc.) and/or a date preference (e.g., release date, viewing dates, broadcast dates) pertaining to the personalized channel 107 for configuring and/or identified media sources for content via the source component 114 at one or more user defined scheduled times. The user profile data configured by the profiling component 116 can further include classification criteria that include at least one of a theme, an age range, a media content rating, an actor or actress, a title, and the like metadata for identifying content, communicating media sources identified, and/or identifying updated media content of a media source and/or particular broadcast/upload/data store/feed stream.

The blocking component 304 is configured to a blocking component configured to block at least a part of the video content from the plurality of media sources based on at least one classification criterion comprising a title, a media source, a timed duration, a rating, a time, a date, or a genre. For example, the blocking component 304 can configure the personalized video channel 107 to stream only cartoons and to block other content/media sources 102 that could be identified from other sources, such as adult rated content, or other content that is not suitable for a child. In another example, a personalized video library having personalized video content as identified by the source component 114 could be blocked form being published. For times, in which personal video content is scheduled for the channel 107 to stream, this content could be blocked to all user's except family, therefore the channel 107 could operate on stand-by mode or some other sleep mode and not be streamed to a particular device, and/or a particular sub-profile data that is part of the user profile data overall.

Some of the time slots for the personal video channel 107, for example, could be left open for selection at the time of viewing, and thus, not be pre-scheduled, while other time slots are scheduled. Therefore, video content/media sources can be blocked by the blocking component 304 for the specified time slots. For example, mornings could have various video content as being blocked for children to view the channel 107 with some freedom of selection from among video content and sources, but on a limited basis so that adult rated content is not able to be accessed or some other classification of video such as by title, genre, language, rating, etc.

In another embodiment, the scheduling component 208 is configured to generate a schedule of video content from the plurality of media sources via the personalized video channel 107 based on the set of user preferences and the set of viewing controls, and to configure the personalized video channel to communicate the video content from the plurality of media sources 102 according to the schedule of video content. The scheduling component 208 thus controls timing aspects of the personalized channel 107 based on the user profile and control settings generated by the control component 118 for the personalized channel 107. For example, a popular reality show from a web page and/or broadcast could be communicated via the personalized channel at a specific time and consecutively follow-up with a Facebook news feed of friends via the same channel. As such, content from different media sources can be scheduled at predetermined times that are different from the pre-scheduled programming times of the media source in which it originated or from updated times.

For example, video content from a first media source of a first time can be rendered to the display component at a user defined time and video content from a second media source at a second time can then follow and/or be scheduled for other times. This can enable the primary user to have dynamic video content from multiple different media sources at user defined scheduled times and interact dynamically via the user profile with updated content, viewing options and/or present newly participating or discovered media sources for video content to be communicated from as selections for being rendered, to be followed for updates and/or for portioning into partitions for viewing as segments.

In another embodiment, the scheduling component 208 can operate to schedule portions of programming based on the user profile. For example, a certain topic of interest could be classified by the user preferences to predominate the selected personalized channel 107 at a particular time, such as content pertaining to a local disaster or pending disaster, as well as any other topic. Other aspects of the user profile can also be used as the portioning criteria, such as age category, audience rating, user interest, behavioral data representing user input controls related to video content (viewing, fast forwarding, skipping, purchasing, searching as search criteria, etc., as input actions. Segments or portions of subsets of videos or programming related to a local event can be extracted or spliced at transitions points (e.g., points between news stories within an hourly news broadcast or some other interval scheduled broadcast) to provide programming related only to the specific topic. The channel can be dynamic in real time, or, in other words, based on programming from media sources at the present time, and/or encompass programming that has already occurred within a certain defined time and has been recorded or stored in a data store. The programming recorded/stored can then be introduced among options for communication/viewing via the personalized channel 107 as user defined times rather than broadcast and/or updated times.

Additionally, the programming of scheduled video content and/or updated content can be performed via the channel 107 as selections by the user. New updated content from the plurality of media sources can be presented first while older content can follow in an order of relevance of a listing. The scheduling component 208 can then receive selection for one or more of these and scheduling options (e.g., times, dates, store, scrap, etc.) for rendering via the channel 107. For example, a user could desire to have history rendered via the channel 107 on Saturday nights with video content that is from other times and/or at the programmed times and then have a news feed from a different channel aired at a different previous time or in real time after the history programming. Times, dates and the channel 107 can be programmed based on the user profile data for any number of channels, media sources, video content, content options and/or portions of content to be rendered via the channel 107.

RSS feeds and/or feeds as discussed herein can comprises a group of web feed formats used to publish frequently updated works—such as blog entries, news headlines, audio, and video—in a standardized format. An RSS document (which is called a "feed", "web feed", or "channel") includes full or summarized text, plus metadata such as publishing dates and authorship, which can be used to identify, communicate, obtain and/or render video content associated with the feed. RSS feeds or feeds, for example, can benefit publishers by enabling them to syndicate content automatically. For example, an XML file format allows the information to be published once and viewed by many different programs. They benefit readers who want to subscribe to timely updates from favorite websites or to aggregate feeds from many sites into one place.

RSS feeds can be read using software called an "RSS reader", "feed reader", or "aggregator", which can be web-based, desktop-based, or mobile-device-based. The user subscribes to a feed by entering into the reader the feed's URI and/or by clicking a feed icon in a web browser that initiates the subscription process. In one embodiment, the source component 114 can at least partially operate as an RSS reader that checks the user's subscribed feeds regularly based on the profile data generated via the profiling component 116 for any updates that it finds, and provides a user interface to monitor and read the feeds. The computing system 104 further operates to identify and updated broadcasted data, subscription sites without RSS feeds, but that provide video rental, channel episodes/programming and the like based on a regular or periodic subscription service. The computing device 104 operates therefore to avoid manually inspecting all of the websites, channels, as well as social sites (e.g., Facebook, Twitter, etc.) and subscription services for download, such that new content is automatically checked for and advertised by their browsers as soon as it is available.

Figure 4:
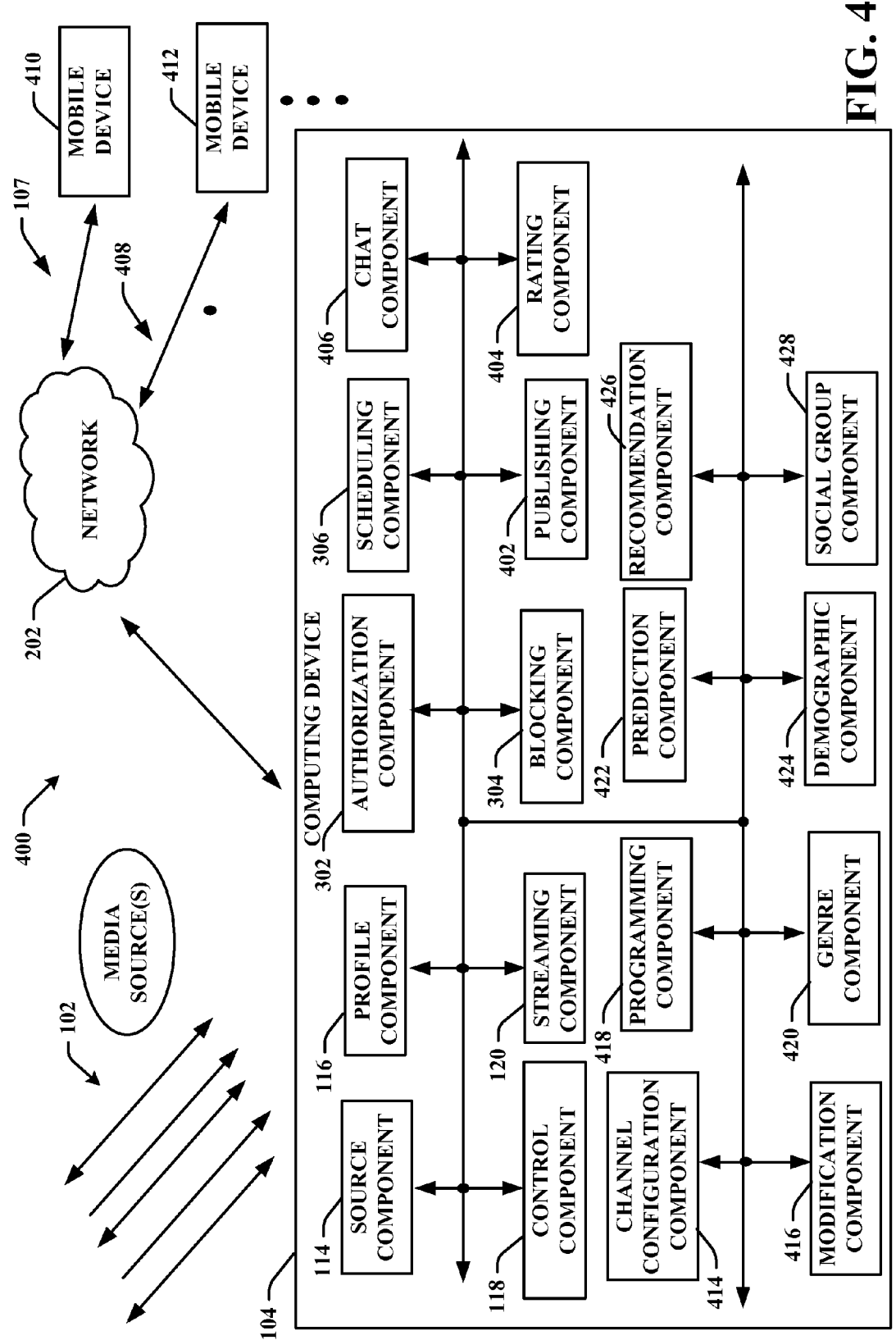
FIG. 4 illustrates another example system in accordance with various aspects described herein.

Referring to FIG. 4, illustrated is a system 400 for one or more personalized video channels in accordance with various embodiments described in this disclosure. The system 400 includes the computing device 104 with the components discussed above. The computing device 104 further includes a publishing component 402, a rating component 404, a chat component 406, a channel configuration component 414, a modification component 416, a programming component 418, a genre component 420, a prediction component 422, a demographic component 422, a recommendation component 426, and a social group component 428.

The computing device 104 is operable to publish components via the publishing component 402 to, from and/or via the network 202 for implementation of the operations of the computing device 104 at one or more client components or mobile devices. The publishing component 402 can further operate to publish personalized configuration channel(s) 107 for subscription to or viewing by other mobile devices other than the mobile device authorized for configuring the channel or the same device, at scheduled times and identified media source(s).

The publishing component 402 can operate to control what mobile devices, networks, and/or web feeds are provided content via the personalized video channel 107, for example. The video content could be generated, for example, from a personal data store of family videos, as well as from various other broadcasting media, web pages, web feeds, and the like media sources. The video content could then be published to a social network for friends and family, and/or for one or more viewing devices for friends and family connected to a mobile device 412 via the network 202 for viewing content associated with the particular mobile device's user preferences. Videos of family, grandchildren, etc. could then be followed up with and/or subscribed to at various predetermined times. Consequently, grandparents could follow the growth of grandchildren and events published via the family personal channel before calling each week to their children, while also watching similar content via the same personalized channel for sake of conversation, or further interest.

In one embodiment, a user via the mobile device 412 is operable to configure the channel 408 as having a first set of video content from a first set of media sources (e.g., set of MTV videos, Facebook news feeds, chat/video conference screen, the Grammy awards, etc.) and the communication channel 107 via a second different set of video content from different media sources by setting the content and/or managing the user profile data for settings, classifications/classification criteria, and/or behavioral data representing user input controls related to video input, as well as thru controls generated by the control component 118. The user profile data could be entered or learned to provide the Grammy awards, for example, via the personalized channel 408 at the same time as to mobile device 410 for viewing on, and thus, while FIG. 4 illustrates a different channel 408 that is configured for viewing to the mobile device 412, the channel 408 could alternatively or additionally be shared to both devices 410, 412.

The publishing component 402 is operable to publish a channel, such as the personalized channel 107, or 408 for any connected viewer or one authenticated by the user profile data or from a sub-profile data (subset of associated profile data) of the user profile data for access. For example, a request could be received by one viewer or one mobile device to another for accessing a personalized channel that is configured by the mobile device that is in control of personalizing or configuring the particular personalized channel. The publishing component 402 operates to communicate to the requesting mobile device the personalized channel (e.g., channel 107) upon acceptance of the request by the configuring/primary user mobile device (e.g., mobile device 410). One or more devices are able to access a personalized channel with personalized content and from a selected media source at any given time while also utilizing resources to share the personalized experience, such as with video chat, chat component, searching capabilities, suggestions, rating, personal content viewing, and/or personal commercial marketing intermittently with configured programming from different media sources and/or personal video content at the data store(s) 110.

In one example, the personalized channel 107 can be configured by both the mobile device 410 with programming from one wired broadcast and of another wireless broadcast thereafter, and regardless of the different media sources and their sequential video content via the personal video channel 107, family videos in a data store of the mobile device 410 could be streamed intermittently, and/or other video content from a personal data base in communication with the mobile device 410. In another embodiment, control of the personalized channel and the configuration of the channel can be dynamic and be altered by the user profile data of the mobile device that is configuring the personal communication channel, such as with a password or other security. The mobile device 410 could alter the viewing of the Grammy Awards via the channel 107, therefore, to provide content from MTV videos playing different content, either at different times, intermittently, and/or at sequential times before and/or following the Grammy Awards. For example, while two devices 410, 412 (as examples of the display components or client components herein) are viewing the Grammy Awards, the mobile device 410 could alter the media source and/or viewing content to demonstrate, supplement, or change the main viewing to other video content. Both mobile devices could decide together that one type of video content is undesirable (e.g., boring) so a chat screen could be published via the publishing component 402 and utilized to indicate the desire to switch to another on the personalized channel 408. The mobile device in control of the configuration could opt to draw from an online video rental, other broadcast channel, a Facebook feed, etc., in which the two mobile devices would more enjoy with one another and on different mobile devices.

The rating component 404 is configured to receive a rating to associate with the video content or a media source, which the prediction component can utilize to further predict video content/media sources to communicate via one or more personalized video channels. For example, a mobile device 410 that receives predicted content via the personalized video channel 107 could provide a "like" or "dislike" to the particular video content/media source transmitted. The rating could also be a one to five star rating, a scaled rating on a measure of one to ten, or some other rating measure. The rating component 404 can store the rating for the prediction component 118 and/or recommendation components 304 to assess together with user profile data, comprising user preferences and user behavioral data learned, in order to provide increasingly more relevant video content recommendations and predicted scheduling content based on a user's taste and interest determined through the mobile device 410 and/or other data stores.

The chat component 406 is configured to communicate a chat screen via the personalized video channel to at least two mobile devices receiving the video content from the plurality of media sources via the personalized video channel. The chat screen from the chat component 406 can comprise a video chat screen for generating a video chat session, and/or a text dialogue that communicates via the personalized channel 107 and/or 408, for example, during, before and/or after viewing video content with one or more other mobile devices, such as with the mobile devices 410, and 412.

The channel configuration component 414 is configured to modify the personalized video channel 107 and/or 408 to communicate the video content based on the predicted video content and/or on the set of user preferences of the user profile data. The channel configuration component 414 enables a plurality of channels to be configured and further communicate personalized video content from a plurality of media sources to one or more mobile devices 410, and/or 412. A set of user profile data can be assigned to the respective channels 107 and/or 408 independently so that the channels can be configured based on respective sets of user profile data (e.g., user preferences and/or behavioral data). For example, a channel 107 can be configured to communicate a first set of media sources with a first set of video content at different times and/or video content portions from at least two of the channels, and another channel 408 could be configured to communicate a second different set of video content and/or video content portions. Further, both channels 107 and/or 408 could be configured based on the same set of user profile data, in which the channel 107 can be configured from one set of media sources to communicate cartoons from a first broadcast station, and subsequently programming from another broadcast station, while the other channel 408 be configured to provide content from different media sources at the same time. Thus, the same user profile could enable a single household to access various programming configured to different channels from different mobile devices as well as access one or the other channel from the same mobile device, in situations where interest could change depending on a user's mood. In addition or alternatively, both channels 107 and/or 408 could be communicated to the same device 410 or 412, in which video content could be displayed alongside, in front of or behind the other video content streaming in different view panes.

The modification component 416 is configured to modify the video content, the plurality of media sources and/or a scheduled time for communicating the video content and/or media source(s) in response to a user input selection. The modification component 416 can modify one or more of the configuration channels and/or media source(s). For example, the modification component 416 can operate to change from one personalized channel 107 to another personalized channel 408 for a particular mobile device 410 for example. The channel 107 could be controlled via user profile data from the mobile device 410 and/or a different mobile device, such as mobile device 412, in which the mobile device 410 receives authorization to receive content via the personalized communication channel 107.

The modification component 416 can operate to alter content at a given time through a selection input or other input control received via a user device, such as mobile device 410 and/or 412. For example, a media source could be changed from a play list of options via a user selection. The modification component 416 can operate to control the prediction grid of the prediction grid component by modifying settings for display of the grid. For example, the prediction grid could show a history of predicted content for a particular time, whether past, present and/or future along the time line or time axis based on predicted content for the time. Alternatively or additionally, the modification component 416 can modify the basis for providing predicted content as dependent upon current recommendations in order to demonstrate viewing trends by which the system 400 can further predict viewing content at particular times, dates for various media sources and video content (programming) from the media sources.

Additionally or alternatively, the modification component 416 can modify the number or the amount of different video content that is provided to a mobile device 410 via the personalized channel 107. For example, a video could be communicated from a broadcast that is either being aired at a broadcast scheduled time, an additional chat screen could be generated for discussing video content, and/or video screen for video communicating with one or more other mobile devices at the same time. In addition, the number of screens for viewing content from different media sources could be modified in order to dynamically search for other video content and sources while viewing other video content and media sources.

The modification component 416 can also operate to configure a media source preference, a time preference to associate with the video content, a personalized channel selection, a theme preference, a rating preference, an actor preference, a language preference, a date preference, past viewing configurations and/or other preferences to the video content and media sources that the video content is derived from. For example, as a user continues to watch a particular series at a particular time, either broadcasted from a station as the source or streamed from an online site or feed, the system can alter a preference for the episodes/series/source to be associated with the particular times. The modification component 416 can dynamically interact with a user via the mobile device 410 for determining preferences, inquiring further about preferences at times, and/or modifying the set of behavioral data from user inputs related to different video content. For example, when an episode from a broadcast is not programmed at the usual time due to alternative programming, other predicted programming could replace it, while the system inquires further or indicates as such to the user for further override or input (via behavioral data and/or preference selections).

Based on available open sources data, and published listings, such as published TV listings, analytics statistics of content popularity based on time events, and/or metadata related to other video content, an average timetable by genre can be is established by a programming component 418 from demographics, and/or media sources that are able to be identified by the source component 114. The available video content and media sources can, for example, vary depending upon location, access, subscription services that a mobile device has access to, as well as web feed subscriptions, social networks, memberships to video content and the like over a network or other connection (e.g., satellite, optic cable, etc.). The programming component 418, for example, is configured to identify scheduling data corresponding to at least part of the video content from media information sources and further communicate external data from open sources and/or from metadata associated with any video content identified from media sources to the scheduling component 306 for generation of the programming schedule for configuring the personalized video channel, which is or can be considered the personalized channels configuration schedule for generation video content at associated times, dates, and corresponding media source therefor. The scheduling component 306, for example, is further configured to generate the programming schedule or play list that is further based at least partially on the scheduling data corresponding to the at least part of the video content from the programming component 306. The media information sources can comprise the plurality of media sources an additional media source that generates open source data for at least one wireless broadcast channel, the wired broadcast channel, and/or one of the media sources from which video content originates.

The genre component 420 can operate with the programming component 418 and other components of the system to generate classifications of the video content from the plurality of media sources based on a plurality of genres. The genre component 420 operates to identify the video content from media sources according to a classification, such as a genre. Other classifications could also be generated rather than just genre types and the associated video content related to the different genres, such as a time period (e.g., 1960's movies), an audience rating, late night/morning showing, documentary, reality, science, fiction, language, nationality, race, origin, and the like. The scheduling component 306 is further configured to generate the programming schedule further based on the classifications identified by the genre component 420 and according to a dayparting scheme, in which some times are provided with particular classifications of content. The genre component 420 can operate for dayparting with the scheduling component 306. The computing device 104 can configure a personalized video channel based on a dayparting scheme comprising a list of defined times for particular classification to be associated with the times/dates and therefore configure the personalized video channel with video content from media sources generating the particular associated classification. In addition or alternatively, particular video content selections from the different media sources could be designated and/or predicted to be shown by the system where no designation is made, or where a media sources is assigned, but not particular video content is designated.

As time goes by, system 400 operates to continuously collect information of playback and rejections by each user including event timestamps and based on such data starts building individual predictions via the prediction component 118 based on content type and dayparts. In one embodiment, predictions of content are made, which can include past, present and future predictions via a prediction component 422. The predicted video content can include current scheduled content configured based on the best or most relevant predicted content and other closely related content can be provided as future predicted content. In addition or alternatively, a personalized list of recommendations could also be provided or communicated via the personalized channel 107, for example. The end result of the system is a personalized list of recommendations of content different for each user depending on the time of day, day of week, time of year of using the system by the user. It is, to a new user, relevant to time of viewing of content by all users of the system or, to established user, relevant to time of viewing of content specific to that user.

The system 400 also is configured to operate as a predication system and to predict not only what each user via a user device likes to watch or listen to overall, but what he wants to watch or listen to at a particular weekday, daytime, around event date, i.e. Christmas, Wedding anniversary, etc. Thus, after the system 400 collects sufficient information about user habits, it would be able to make such predictions. But before sufficient information is available, there is a problem of cold start, which a demographic component 422 provides solution and further supplements operation of the system. The same solution is serving the purpose of a starting point and a template to be adjusted towards each user individual timetable grid.

Initially, each user is assigned to demographic group based on known and guessed information. Later demographics are playing less important role in individual recommendations for each user, but it is still important to establish averages for forming recommendation for new users assigned to the same demographics group. Next, based on available open sources data, i.e., published TV listings, analytics/statistics of content popularity based on time-events, etc., an average timetable by genre is established based on user demographics. Next, all available content is filtered by genre. Each genre is associated with its appropriate daypart. As time goes by, system collects information of playback and rejections by each user including event timestamps and based on such data starts building individual recommendations based on content type and dayparts, in which dayparting herein is intended to refer to the practice of dividing a day into several parts for different programming depending upon the time, the day and the date. The result of the system is a dynamic personalized channel configuration that can include a personalized list of recommendations of content, which can be different for each user depending on the time of day, day of week, time of year, in conjunction with the video content and media sources identified. The system can operate, to a new user, relevant to the time of viewing of content by all users of the system, or, to an established user, relevant to time of viewing of content specific to that user based on the associated user profile data and demographic data.

The streaming component 120 is thus operable to communicate a sequence of the video content from the plurality of media sources, as well as communicate various media content portions based on user profile data and the user controls. For example, the streaming component 120 is configured to communicate an updated video content selection (e.g., a new episode, a new video from an identified friend on a social network, an updated of a social network news feed, a broadcast content programming at a certain time, title, or other related criteria data) as well as portions of each based on classification criteria and any partitions of the video content that is generated by the system 400. The display component such as a client component and/or mobile device 410, 412 is configured to receive the communicated content via the channel 107 and/or 408 and render the content to a display (e.g., a touch screen, panel display or the like). The streaming component 120 can generate the updated video content associated with the updated video content selection in the display component via the personalized video channel in response to an updated video content selection input being received.

The prediction component 422 operates to analyze user profile data aggregated by the profile component 204 and to communicate video content via the personalized channel 107 based on the predicted content. For example, in situations where no scheduled viewing is configured to the personalized channel 107, the prediction component 422 can analyze, store, and communicate updated content via the personalized channel 107, which depends on the user profile data and/or demographic data for such predictions.

The prediction component 422 is configured to generate a set of predicted video content from the plurality of media sources based on the user profile data. In one embodiment, the video channel 107 can be configured with predicted video content at times in which the channel is utilized for viewing, but where no defined media source and/or video content has been selected or configured for the scheduled time of the viewing. For example, the user profile data could comprise information that a user of a mobile phone in primary control of the configuration of the channel 107 views reality shows (e.g., Pawn Stars, Swamp People, Gold Rush, etc.) at about or around the time the device is also scheduled for sleep mode, or shut off. In a situation where the user views his/her personalized channel 107, even though the channel is not configured for a certain date or time, the system could communicate learned likes and dislikes for the particular time and either communicate reality show options and/or select a best option by which to stream video content via the channel 107 to the user.

In one embodiment, a mobile device 410 could set user profile data to transmit video content via the personalized video channel 107 according to a particular mood, a particular interest, a specific activity, a genre, a producing studio/company, an actor/actress, a language, a country/demographic, and the like preference or classification. The prediction component 422 analyzes sets of data that are assigned or associated to the personalized channel 107, in which various sets of data could be assigned to different personalized channels of one or more different client components of different users. As such, the user profile data is utilized by the prediction component 422 to predict viewing likes, dislikes, scheduling, media sources, particular video content, and the other video habits to program or configure the personalized channel 107 for viewing.

The demographic component 424 is configured to classify a user device in a demographic class based on demographic data. For example, a demographic class can comprise a set of data pertaining to the client device's location, physical address, duration within a geographical radius (e.g., more than fifty percent of time in an area code area, zip code, state, residence, and the like), a general broadcast area, cable provider region, in which this data can further include and be a part of the demographic data. The demographic data can further comprise population statistics such as viewing statistics for a viewing region, as defined by the demographic class, such as by area code, zip code, city/state boundaries, cable provider area, broadcast region, regional district, providence, political region, geographically defined region according to a geographic criteria, for example, an Appalachian region or the like.

Users often use client devices (mobile devices, etc.) such as the computer device 104 to search for appropriate/desirable video content for the given moment by scanning stations in search of what they might like or changing to a specific channel if they are looking for a particular content. In other words, typically, users are watching different channels at the different time moment and have to make special efforts for finding what they like or rely on channel manager to guess his tastes. The demographic component 424, for example, can comprise demographic information, and/or retrieve via a communication link, network, site, web feed, cloud network service, and the like a set of population viewing statistic data relative to the region as defined by the above criteria for the demographic class as the user device is identified to belong. For example, in the southeast region of Tennessee, a broadcast channel particular to outdoor activities, such as hunting, fishing, and trapping is broadcast in a particular area close to North Carolina. Viewing statistics indicate a greater likelihood of people in the East Tennessee area to watch fishing and in the North Carolina section to watch the hunting and trapping portions more due to a number of factors. This is an example of one viewing statistic. However, the demographic component 422 further factors dayparting information for viewing statistics, but conglomerates the data for a multiplicity of channels, broadcasts, locally, regionally, wirelessly, wired broadcast identified, web feeds, news feeds, social network feeds, personal data stores, site video subscriptions to one or more video rental/purchasing sites, channel webcasts, video distribution sites and the like.

The recommendation component 426 is configured to recommend the video content based on the user profile, as well as recommend portions of video content and/or further media sources upon which to derive video content for communication via one or more personalized channels 107, 408. The recommendation component 426 can operate to communicate a set of recommended media content, media content portions (i.e., segments of media/video content) based on a set of classification criteria (matching audio content to search terms, theme, genre, audience category, language, location, actor/actress, personal video classification based on metadata, and the like) and/or user preferences of the user profile from the profile component 116, which can include past viewed content. For example, the set of user preferences can include a selection of video content from media sources 102, in which the recommended media content portions of the selection of video content can be identified.

The recommendation component 426 operates to further narrow searching or identification of media content portions (e.g., segments of at least one of scheduled programming, video content, video feeds, social networking sites, video subscriptions services, and the like) within media content and video content (e.g., identified programming, movies, videos uploads, etc.) from the set of media sources 102. Because the volume of media content can be large from multiple different data stores/sources with different broadcasting channels, and/or web pages, the recommendation component 422 can further focus the generation of video content and associated portion to a subset of recommended video content (e.g., programming) and/or portions (e.g., segments of programming, such as news clips within a news broadcast), and provide options via mobile devices 410 and/or 412 to configure a personalized channel with other video content and/or media sources other than predicted content, and/or other prescheduled configured content/sources. In this way, various types of refined preferences can be used for various types of objectives as they are modified and/or entered into the user profile dynamically. For example, specific cultural significances, specialty significances, educational objectives, audience categories, language preferences, racial preferences, religious preferences, and the like can be used to generate portions of media from larger volumes of media content and from video content of various media sources, which can be defined in addition to other more standard preferences such as a theme (comedy, romance, drama, etc.). A user not satisfied with previously programmed content for the channel, either predicted and/or previously configured can search content via the network 202 in a search engine component (not shown) while being supplemented with recommendation options at the same time. Therefore, the user can be presented with recommended content as identified by the system from identified media sources 102 and also search results based on the search terms from the user's own search over particular/specified/other data stores.

The social group component 428 is configured to receive a request from different mobile devices to communicate the video content from the plurality of media sources. For example, the mobile device 412 could communication request for joining, subscribing, accessing the personalized video channel that has been configured and controlled by the mobile device 410. The mobile device 410 could then provide an acceptance that is for particular times, full access and/or reject the requested based on the control of the configured channel being associated with the user profile (data) of the mobile device 410. In this manner, select groups of users and/or mobile devices can access configured personalized video channels at certain times to be interactive with personal videos regardless of location, and over a network 202, for example. While a video chat occurs, stored video can also be generate to recap events, such as a baby's first steps, a birthday, etc., while also viewing scheduled content at particular times from different media sources based on the configurations, user profile data, and demographic data of the controlling device, such as mobile device 410 for the personalized video channel 107.

Figure 5:
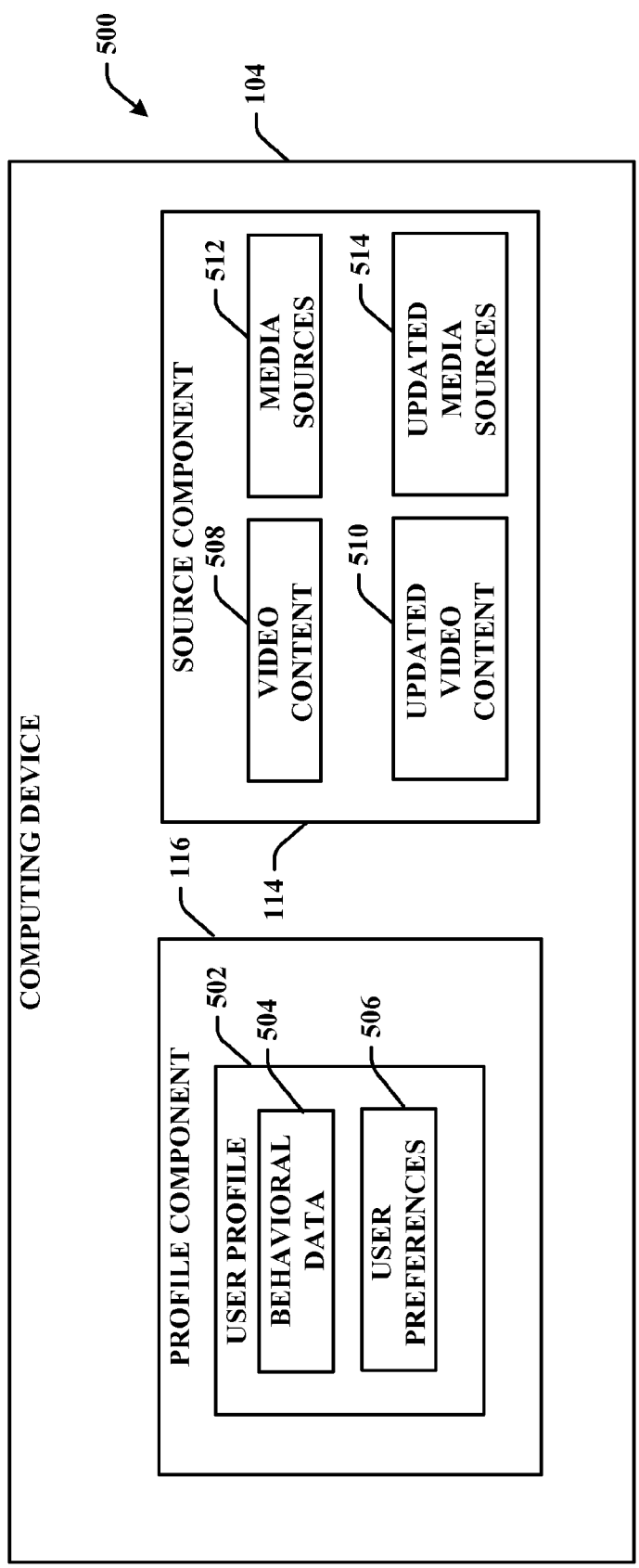
FIG. 5 illustrates another example system in accordance with various aspects described herein.

Referring now to FIG. 5, illustrated is an example system 500 in accordance with various embodiments disclosed. The system 500 includes the computing device 104 as discussed above with the source component 114 and the profile component 116 provided only for ease of discussion. The profile component 116 is communicatively coupled to a user profile 502 that comprises a set of behavioral data 504 that represents user input controls relating to the video content and the media sources, which are identified by the source component 114. The user profile 502 further comprises a set of user preferences 506.

In one embodiment, the set of behavioral data 504 comprises purchased video content related to the user profile data, viewed video content related to the user profile data, stored video content related to the user profile data, and/or search criteria for video content related to the user profile data. For example, a purchase of video content could be made with the computing device 104 or via a different device in communication with the computing device 104. The purchase can be stored as part of user profile data. The computing device 104 can utilize the purchase data along with other data learned in the user profile to recommend video content and/or media sources that are identified by the source component. The user can then opt to select a time slot, video content, and/or media source available through the recommendations provided. The personalized channel (e.g., channel 107, as discussed above) generated by the computing device can be configured with the times, content and source data according to the user's selection.

For example, a documentary on dinosaurs could be identified from a broadcast channel station (e.g., a public broadcast channel or the like) and the personalized channel be configured to transmit or communicate the documentary at the time that it is being broadcast. At the same time, a documentary similar to one that was purchased by the user could be configured to play after the dinosaur channel through a user selection of a selected content and/or media source as well. As mentioned above, the user preferences can also include viewed video content related to the user profile data, stored video content related to the user profile data, and/or search criteria for video content related to the user profile data, which can facilitate providing further recommendations, a past history record, as well as other information learned about the user's viewing habits, and/or for configuring/identifying further video content and media sources for a particular channel to be personalized at scheduled times/dates. The set of behavioral data can also include viewing data, search data, purchase data, location data, language data, age data, household membership data and/or subscription data.

In addition, the user preferences 506 can comprise a media source preference and/or a time/date preference to associate with the video content for viewing on a channel (e.g., channel 107) configured according to a user preferences and/or behavioral data related to video content. The user preferences 506 can further include a personalized channel selection where multiple channels are configured based on a user's personal preferences or classification criteria such as a theme preference, a rating preference, an actor preference, a language preference, a date preference and the like.

In one embodiment, the profile component 116 is further configured to receive a first user preference of the set of user preferences from selections related to the video content and identify a second user preference based on the set of behavioral data. For example, a personalized channel configured by the computing device for rendering different video content from different media sources at various times could recommend horror movies based on a theme preferences that a user has entered, as the user begins to override the preference and select different themes at a particular time or date, the system 500 could further recommend similar video content from differing media sources for viewing at the same time or on similar dates (e.g., weekly dates, etc.). Thus, a dynamic system 500 identifies, recommends and learns various user preferences and how they relate to one another in order to provide a dynamically configurable channel at the user's disposal.

In one embodiment, the computing device 104 is further configured to access at least one of the plurality of media sources based on the user profile data 502, such as when the user is subscribed to an online video rental site, a social network site that updates video content of friends associated with the user, as well as other web page feed services. For example, the user profile data can include access data to one or more web pages/sites, subscriptions services and/or other external video providers. This content can be presented to be configured into the personalized channel for viewing at predefined times or dates, as well as be used for recommendations based on other user profile data.

The source component 114 is further configured to identify updated video content 510 from among video content 508 that is different from the video content 508 previously accessed or identified as potential candidates for the personalized channel. This computer device 104 can thus communicate an updated video content selection of the updated video content 512 to the display component, and the display component is configured to generate the updated video content 510 associated with the updated video content selection in the display component via the personalized video channel in response to an updated video content selection input being received.

In addition or alternatively, the source component 114 can identified new or updated media sources 514, which could be identified from a more detailed search for media sources by the source component 114, a new broadcast or web page/site, a new subscription accessed/identified by the user profile data, and/or newly stored content in a data store or video library. A user selection could also be received for streaming via the personalized channel at particular times or dates that relates to which media source 512 or update media source 514 to render in a display or mobile device.

Figure 6:
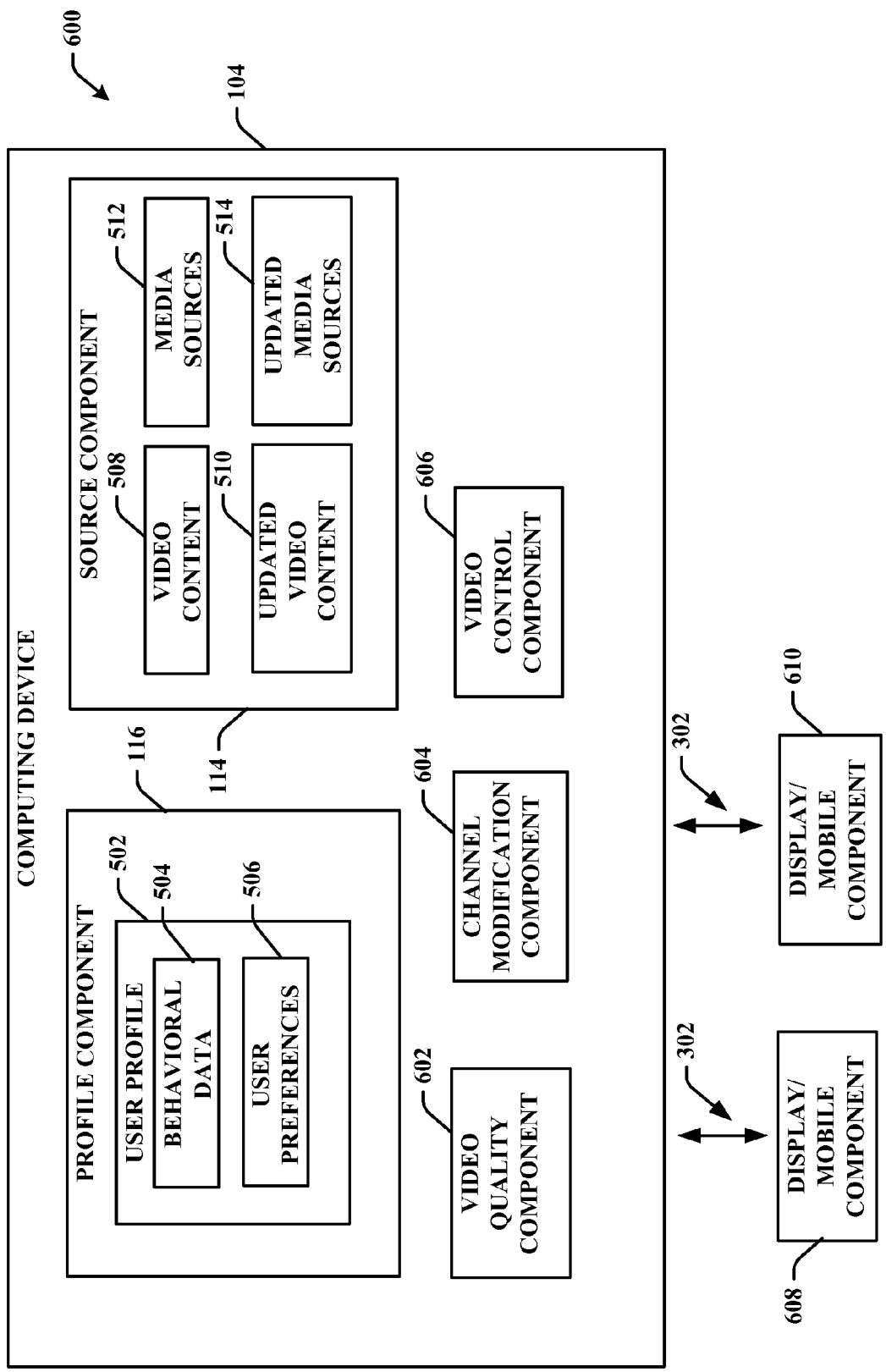
FIG. 6 illustrates another example system in accordance with various aspects described herein.

Referring to FIG. 6, illustrated is an example of a system 600 in accordance with various embodiments described herein. The computing device 104 comprises components detailed above and further comprises a video quality component 602, a channel modification component 604, and a video control component 606.

The video quality component 602, for example, is configured to analyze the video content 508 and/or 510 from the media sources 512, 514 to determine a set of video characteristics comprising at least one of bitrate, frame rate, frame size, audio content, formatting, a title, an actor or actress, or metadata pertaining to the video content. The channel modification component 604 can operate in conjunction with the video quality component to configure the quality of a personalized channel. The system 600 can operate to compare duplicate video content and eliminate the duplicates that do not satisfy a predetermined threshold for quality, and thus, leave only the video content among the duplicated video content with the highest quality metrics or that is of a greater quality of service based on one of the set of video characteristics.

The channel modification component 604 is further operable to change channels that are personalized from a first personalized channel that is based on one set of user profile data and to another personalized channel that is based on another set of user profile data. In one example, the channel modification component 604 can comprise a channel control as part of the channel control component 606. The channel control component 606 can operate to alter the video content from the media sources by generating a forward, rewind, pause, skip and other graphical controls for affecting video content generated on a single personalized channel, such as channel 408. The channel control component 606 can operate to change personalized channels, which each can be configured according to a different set of user profile data 502 or a different set of user preferences 506. In addition, the video control component 606 can generate selections for altering a media source and/or a video content to be streamed over the single personalized channel 107, for example.

In another embodiment, the video control component 606 can operate to control subscriptions to a personalized channel, such as the personalized channel 107, and/or 408. For example, the display component or mobile device 608 comprising a display component can facilitate the configuration data for a personalized video channel. The display component or mobile device 608 can thus subscribe in a request to the channel 408 that is personalized by the user profile data 502 from display component 610. Therefore, two mobile devices 608, 610 can view the same content at the same time together, and/or separate at different times. In one example, selections can be received via the display component of mobile device 610 for configuring the personalized video channel for the display of mobile device 608. The selections can facilitate rendering of the video content from the media sources by receiving at least two selections, such as a video content selection, a media source selection, a topic selection, a duration selection, a title selection, a language selection, and/or a video play list/selection, a date selection, or a recommendation selection.

Figure 7:
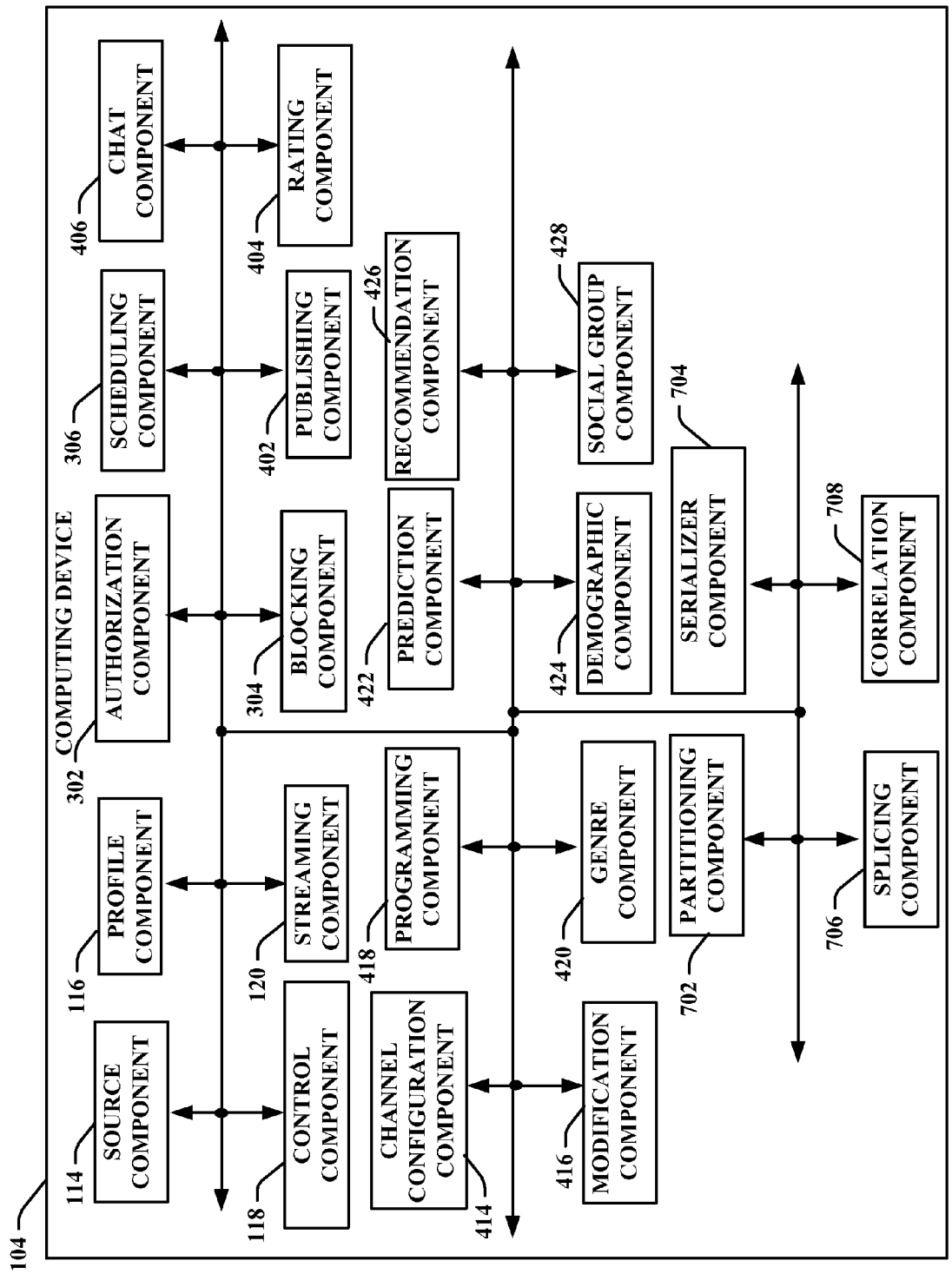
FIG. 7 illustrates another example system in accordance with various aspects described.

Referring now to FIG. 7, illustrated is another example system 700 for communicating predicted video content aggregated from media sources via a single personalized video channel in accordance with various embodiments described. The computer device 104 further comprises a partitioning component 702, a serializer component 704, a splicing component 706 and a correlation component 708.

The partitioning component 702 is configured to partition the video content from the plurality of media sources based on the user profile data (user preferences and/or behavioral data that represents user actions relating to video content). The partitioning component 702 operates to partition the video content of one or more media sources 102 into a plurality of video content portions (segmented partitions of programming, of videos uploaded on a web page, or of other video content) based on a defined set of criteria (e.g., the classification criteria) that comprises at least one of a topic, an audio content, a transition point in the video content, a duration or time frame, a match of the set of user preferences of the user profile data or the audio content of the video content being determined to match a word or phrase of a search term/criterion or terms/criteria of the defined set of criteria. The classification criteria can be part of the user profile data such as part of user preferences as a category for video classification preferences.

In one embodiment, the partitioning component 702 operates to partition video content into segments or subsets of the programmed content based on criteria defined as part of the user profile data. The portions or segments can be part of a video content as defined by a time frame, an end time, a title, and/or other defining or classifying criteria. For example, a portion of video content can be a section, segment or portion of a news broadcast, in which a certain topic could be discussed relating to a hurricane in New Orleans, while the entire news broadcast could be a designated hour long having multiple different segments related to different news topics or stories.

The streaming component 120 is thus operable to communicate a sequence of the video content from the plurality of media sources, as well as communicate various media content portions based on user profile data and from different media sources at different times. For example, the streaming component 120 is configured to communicate an updated video content selection (e.g., a new episode, a new video from an identified friend on a social network, an updated of a social network news feed, a broadcast content programming at a certain time, title, or other related criteria data) as well as portions of each based on classification criteria and the partitions generated from the partitioning component 702. The personalized video channel 107 can be configured to render the content to a display (e.g., a touch screen panel display or the like) and generate the updated video content associated with the updated video content selection in the display component in response to an updated video content selection input being received.

The serializer component 704 is configured to concatenate the video content from the plurality of media sources into a set of video content sequences, such as a sequence of scheduled programs, video uploads, new feeds, and/or video content portions of programs/uploads/feeds. For example, the set of video content sequences can comprise a portion of the video content identified from a media source based on the user profile data, as well as other video content from other media sources. Programming can be scheduled from scheduled content as published by the media sources and/or dynamically generated based on video content identified from the plurality of media sources based on the user profile data, such as with a video update on a social network, newly added downloadable content from a video rental site, video subscription service or other web page/site.

The splicing component 706 is configured to identify a portion or segment of a programming within the video content of a corresponding media source and extract the portion of the programming based on user profile data. The splicing component 706 can operate as a separate component from the partitioning component 702 and/or as a complimentary component of the partitioning component 702. While the splicing component 706 can operate to generate portions of video content segments or subsets of defined sets of video content, the partitioning component 702 can operate to generate the video content segments, or, otherwise known as, video content (video(s)) from different media sources. Some media sources, for example, such as a social network site could provide data indicating that a video upload or updated video content has occurred for one or more friends within a user's network. These videos could corresponding to different full length videos, which could range from a few minutes to hours, or more in duration, but have a defined beginning and ending point. However, broadcast television programming could have continuous video streaming that could be recorded and communicated via the personalized video channels 408 and/or 107, and/or communicated at the time of broadcast. The partitioning component 702 can operate to divide the different programming and video content identified among various channels, such as channel 408 and 107 based on user profile data, and/or divide broadcast programming to different channels as well as for different times, in which programming from one local broadcast could be streamed and then another local broadcast of a different station could be streamed thereafter without the user having to change a channel as in traditional methods.

The splicing component 706 can generate portions of segmented video content or of full length content that is not continuously broadcasted. For example, a new station could report, broadcast and/or upload a news hour broadcast. The different portions or stories could be dynamically spliced based on user profile data, such as search data. The portions can be presented to the user dynamically as options and then played to the client component 304 and/or 414 based on the user profile data and/or selections to the options.

The correlation component 708 is configured to correspond or correlate the set of predicted video content from the prediction component 422 to the prediction grid generated by the prediction grid component 301 a set of points in time along a time axis based on metadata associated with the video content (e.g., title, genre, location, producer, media source, etc.) and identification of the media sources of the set of predicted video content for a selected point of the set of points. The prediction grid further includes the different predicted video content along the time line and a relevance line based on a correlation measure of the different predicted video content to the user profile data. For example, where multiple options could have been presented in a prediction grid for a particular point in time based on the user profile data that is either current, or particular to the selected point in time, various options could have been generated as being closer to the user profile data than others. One content could have been recommended thus with a higher relevance or rank to the user profile data than another, in which the correlation component 708 can operate to determine the relevance and/or the rank. The predicted video content can thus be corresponded to a set of points in time along a time axis based on metadata associated with the video content and identification of the media sources of the set of predicted video content for a selected point of the set of points.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases. Reference may be made to the figures described above for ease of description. However, the methods are not limited to any particular embodiment or example provided within this disclosure and can be applied to any of the systems disclosed herein.

Figure 8:
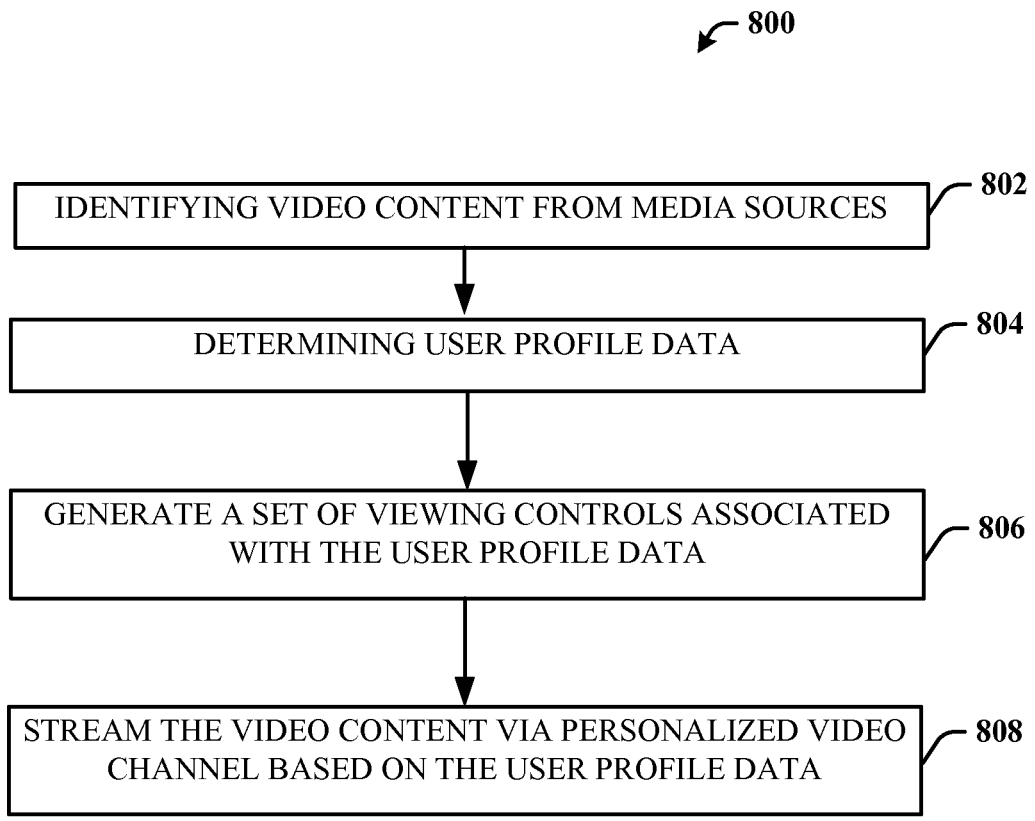
FIG. 8 illustrates an example of a flow diagram showing an exemplary non-limiting implementation for a system in accordance with various aspects described herein.

Referring to FIG. 8, illustrated is an exemplary system flow 800 in accordance with various embodiments herein. At 802, video content from a plurality of media sources is identified to communicate the video content from different media sources of the plurality of media sources at different times respectively via a personalized video channel. At 804 user profile data is determined that comprises a set of user preferences for the video content and the plurality of media sources to be streamed via the personalized video channel. At 806, a set of viewing controls associated with the user profile data is generated, which control transmission of the video content via the personalized video channel. At 808, the video content is streamed via the personalized video channel based on the user profile data and/or on the user controls (viewing controls of control component 118, for example).

The method 800 can further comprise generating a schedule by which to communicate the video content of the different media sources at the different times via the personalized video channel, in which the media sources comprise at least two of a wireless broadcast media channel, a web site, a web data feed, a wired broadcast channel, or a video library. The personalized video channel is operable to be published as configured to a network for access by one or more authorized client devices to view the video content according to the set of viewing controls.

The method 800 can further include providing access to the set of viewing controls and the user profile data. In one example, the set of user controls or viewing controls comprise a timed duration control to define a timed duration for receiving the video content via the personalized video channel, an interactive mechanic control to define an interactive mechanic that interacts with at least one client device while receiving the video content via the personalized video channel, and a monitoring control to monitor a viewing of the personalized video channel.

The user controls or viewing controls can include generating an interactive mechanic (e.g., a rendered graphic) that interacts with a user or viewer of the personalized video channel. The interactive mechanic, for example, can comprise at least one of a video game or video component that generates an interaction with the client device viewing the video content via the personalized video channel, a video image character that generates at least one of a voice, a video image, a text or a phrase via the personalized video channel to the client device, or a symbol to provide an indication of the timed duration for viewing the video content via the personalized video channel.

Figure 9:
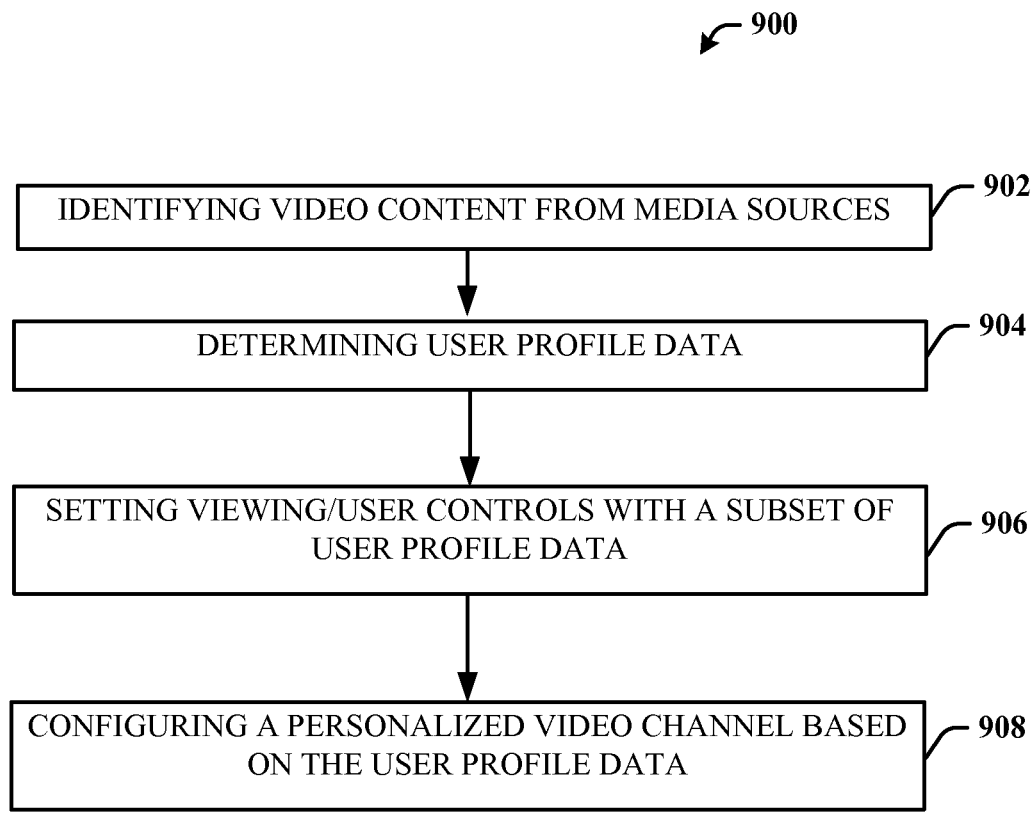
FIG. 9 illustrates another example of a flow diagram showing an exemplary non-limiting implementation for a system in accordance with various aspects described herein.

Referring to FIG. 9, illustrated is another example system flow 900 for generating user controls (e.g., parental controls, viewing controls, etc.) in accordance with various embodiments disclosed. The method 900 comprises identifying, at 902, video content from media sources comprising at least two of a wireless broadcast media channel, a web site, a web data feed, a wired broadcast channel, or a video library. At 904, a set of user profile data is determined for configuring a personalized video channel in communication with a first client device. At 904, the method 900 comprises setting a set of viewing controls associated with a subset of user profile data (sub-profile data, as discussed above) of the set of user profile data that sets a limit and monitors viewing of the video content via the personalized video channel at the first client device or a second client device. At 906, the method 900 comprises configuring the personalized video channel based on the set of user profile data and/or user/viewing controls to communicate the video content from the media sources at defined times.

In one example, the personalized video channel can be configured based on the set of user profile data and user controls to communicate the video content of different media sources at the defined times with a time duration. A timed duration can be set to the personalized video channel with the subset of user profile data, for example, so that a viewing time can be limited or restricted based on a particular user utilizing the channel for viewing and/or a particular devices communicating/rendering video content with the personalized video channel. Further, the video content communicated via the personalized video channel that is associated with the subset of user profile data can be monitored according to a monitoring control of the viewing controls, which can enable content to be monitored remotely at the same time and/or a later time. An interactive mechanic can also be included as part of the viewing/user controls for the personalized channel. The interactive mechanic can comprise a video image character that generates the at least one of a voice, a video image, a text or a phrase via the personalized video channel to provide an indication of the timed duration set for the personalized video channel.

Figure 10:
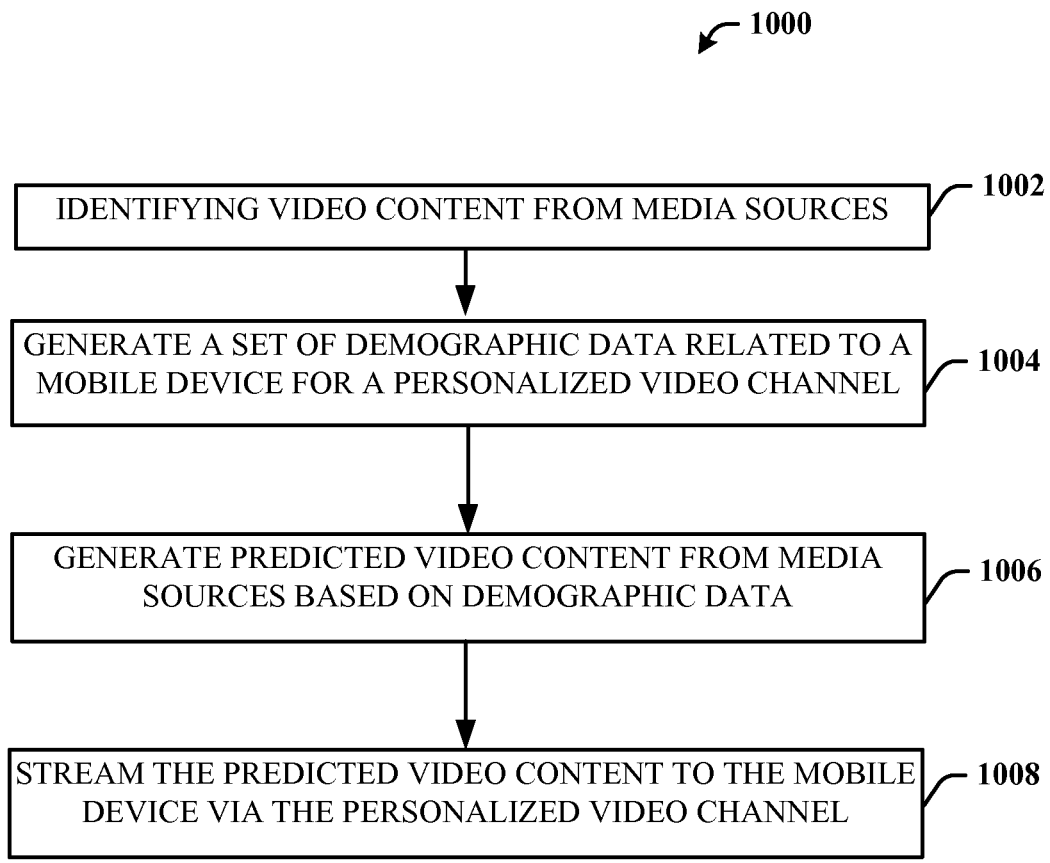
FIG. 10 illustrates another example of a flow diagram showing an exemplary non-limiting implementation for a system in accordance with various aspects described herein.

Referring to FIG. 10, illustrated is an exemplary system flow 1000 in accordance with embodiments described in this disclosure. The method 1000 initiates at 1002 with identifying, by a system comprising at least one processor, video content from a plurality of media sources for configuring a personalized video channel. At 1004, a set of demographic data is generated that is related to a mobile device that is authorized to configure the personalized video channel with a first video content from a first media source of the plurality of media sources at a first time and a second video content from a second media source of the plurality of media sources at a second time. At 1006, a set of predicted video content is generated from the video content of the plurality of media sources based on the set of demographic data. At 1008, the set of predicted video content is streamed in a video stream to the mobile device via the personalized video channel. The media sources, for example, can comprise at least two of a broadcast media channel, a web page, a web data feed, a network subscription service or a video library, and the set of demographic data comprises a geographical location including a political region, a time, a date, and statistical data of viewing preferences related to at least one of the geographical location, the time or the date.

The method 1000 can further comprises associating a weighting measure to the set of demographic data and to the user profile data respectively. In one example, the weighting measure can be modified based on an amount of user profile data generated. In addition, a programming schedule is generated for the set of predicted video content based on the set of demographic data that comprises statistical data of viewing preferences related to at least one of a geographical location, a time and/or a date.

In one embodiment, a chat screen is communicated via the personalized video channel to at least two mobile devices receiving the video content from the plurality of media sources via the personalized video channel. Additionally, the personalized video channel can be configured to communicate the video content from the plurality of media sources at defined times based on user profile data that includes a set of user preferences and a set of behavioral data. The set of user preferences can comprise least one of a media source preference, a time preference to associate with the video content, a personalized channel selection, a theme preference, a rating preference, an actor preference, a language preference and/or a date preference. The set of behavioral data can comprise at least one of purchasing date, viewing data, search data, purchase data, location data, language data, age data, household membership data and/or subscription data, and at least one user input control related to the set of predicted video content being communicated via the personalized video channel.

Figure 11:
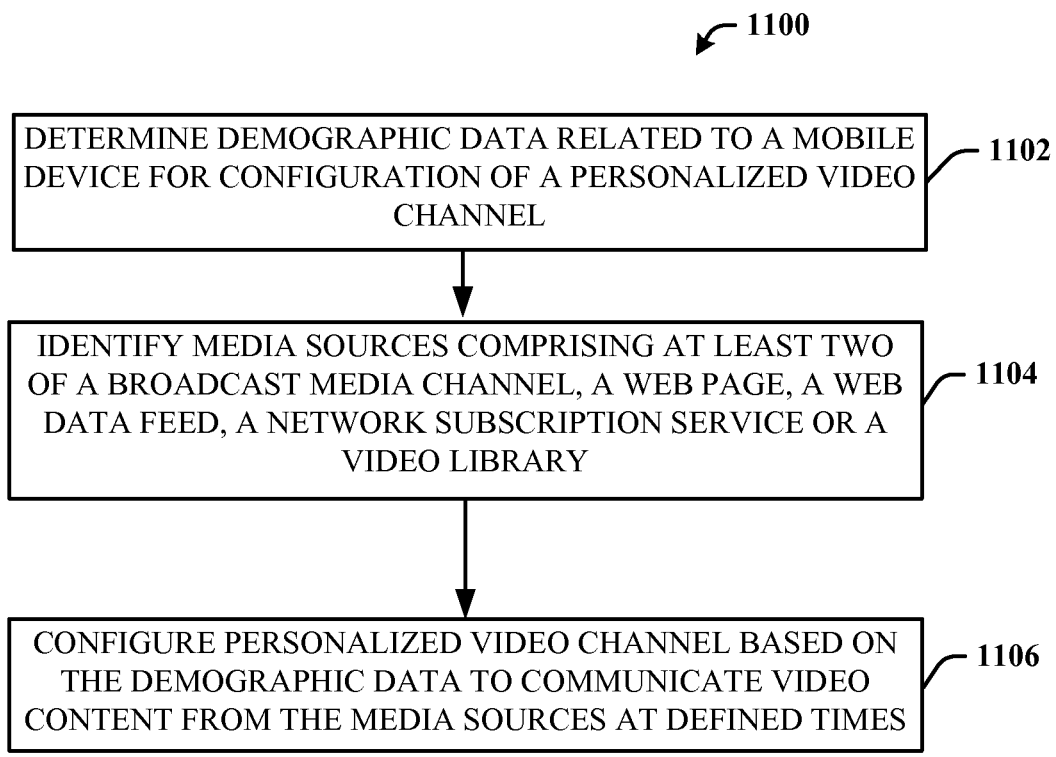
FIG. 11 illustrates another example of a flow diagram showing an exemplary non-limiting implementation for a system in accordance with various aspects described herein.

Referring to FIG. 11, illustrated is an exemplary system flow 1100 in accordance with embodiments described in this disclosure. The method 1100 initiates at 1102 with determining a set of demographic data related to a mobile device for configuring a personalized video channel in communication with the mobile device. At 1104, a plurality of media sources are identified that comprising at least two of a broadcast media channel, a web page, a web data feed, a network subscription service or a video library. At 1106, the personalized video channel is configured for viewing based on the set of demographic data to communicate video content from the plurality of media sources at defined times. The set of demographic data can comprise, for example, a geographical location including a political region, a time, a date, and statistical data of viewing preferences related to at least one of the geographical location, the time or the date.

The user profile data can be determined based on a set of user preferences related to the video content and a set of behavioral data representing user control inputs related to the video content. The personalized video channel can further be re-configured based on the user profile data to communicate the video content of a different media source for a defined time of the defined times. A chat screen is generated to at least two mobile devices receiving the video content from the plurality of media sources via the personalized video channel. A genre classification to the video content from the plurality of media sources can be made, wherein the configuring the personalized video channel is based on the genre classification of the video content for the defined times.

Figure 12:
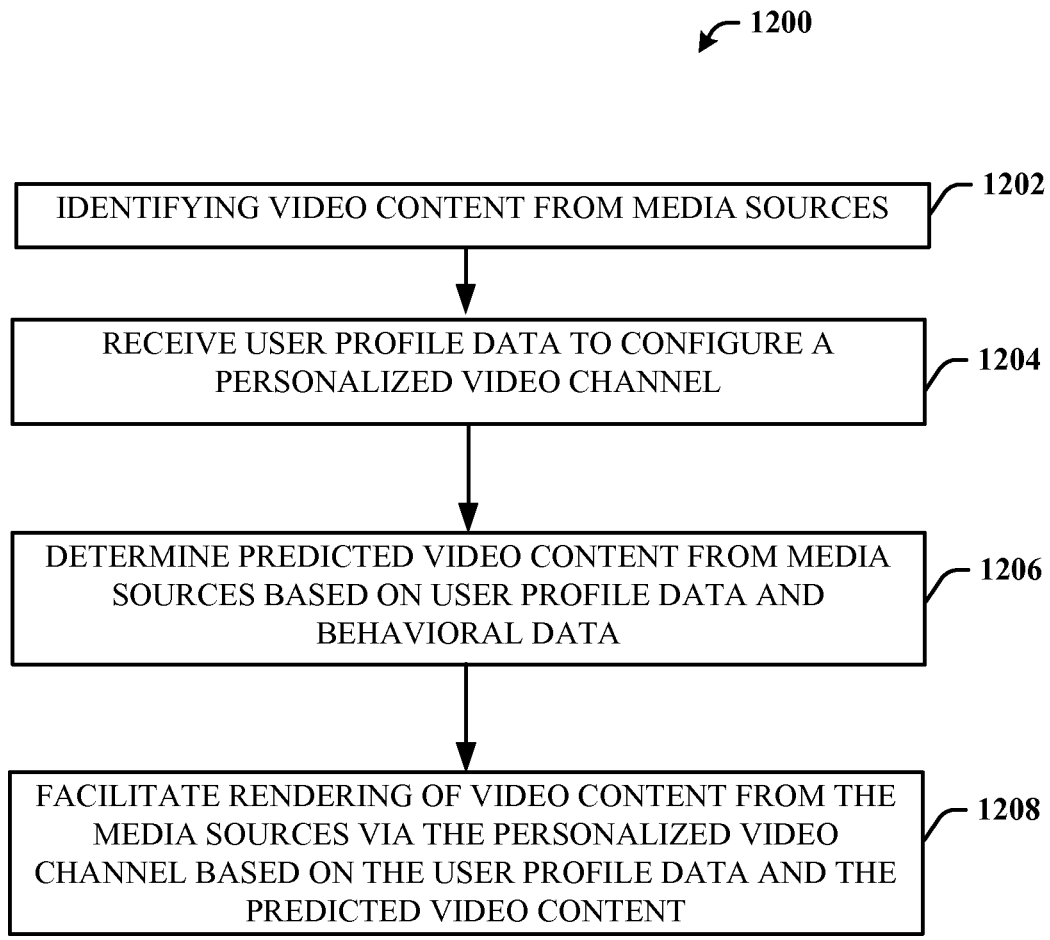
FIG. 12 illustrates another example of a flow diagram showing an exemplary non-limiting implementation for a system in accordance with various aspects described herein.

Referring to FIG. 12, illustrated is an exemplary system flow 1200 in accordance with embodiments described in this disclosure. The method 1200 initiates at 1202 with identifying, by a system comprising at least one processor, video content from media sources for communication of the video content via a personalized video channel. At 1204, user profile data is received or determined to configure the personalized video channel according to a time, the video content and the media sources of the video content. At 1206, a set of predicted video content is determined from the media sources based on user profile data that comprises user preferences and a set of behavioral data representing user control inputs received for the video content. At 1208, a rendering of the video content is from the media sources is facilitated via the personalized video channel in a display component based on the user profile data and the set of predicted video content, such as a selection for the predicted content from the prediction component and/or a user input control selection from among options presented.

The media sources can comprise at least two of a broadcast media channel, a web page, a web data feed, a network subscription service or a video library with personalized video content, such as home/personal videos with a recording device. The personalized video channel is able to be modified by a user with a second video content from a second media source to replace a first video content from a first media source at a designated or scheduled times. For example, the user preferences can comprises a time preference, a date preference, a video content preference, a media source preference or a video portion preference that corresponds to the video content from the media sources.

In one embodiment, the method can include receiving a request from a first mobile device to receive the personalized video channel at the first mobile device. The second mobile device that can be authorized to configure the personalized video channel for different media sources and/or video content identified can generate an acceptance for the first second mobile device. The system can then receive the acceptance and publish the personalized video channel to the first mobile device.

Figure 13:
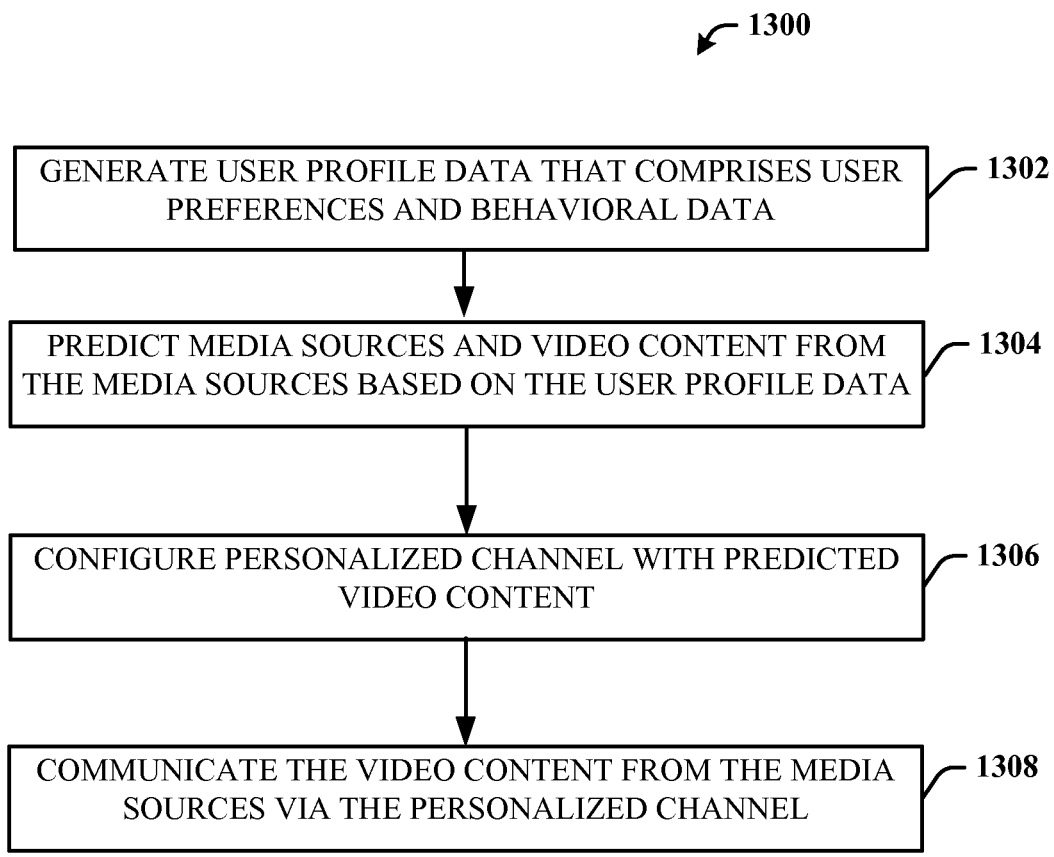
FIG. 13 illustrates another example of a flow diagram showing an exemplary non-limiting implementation for a system in accordance with various aspects described herein.

Referring to FIG. 13, illustrated is an exemplary system flow 1300 in accordance with embodiments described in this disclosure. The method 1300 initiates at 1302 and generates user profile data comprising user preferences and behavioral data representing user control inputs associated with a personalized channel to be rendered by a mobile device. At 1304, media sources and video content communicated from the media sources are predicted based on the user profile data for a viewer or a user of the mobile device. At 1306, the personalized channel is configured with the predicted video content from the media sources at different times based on the user profile data and the predicted media sources. At 1308, the video content is communicated from the media sources via the personalized channel for rendering by the mobile device.

In one embodiment, the method 1300 can further comprise generating a prediction grid that communicates the video content based on the user profile data. The video content predicted is corresponded or associated to a set of points in time along a time line based on metadata associated with the video content and identification of the media sources of the video content for a selected point of the set of points. A prediction grid can also be communicated via the personalized channel to the mobile device, in which the prediction grid comprises a past point of time, a present point of time and a future point of time of the set of points that indicates the video content predicted at the selected point depending on a set of criteria that comprises at least one of user profile data stored at the present point of time, or user profile data stored at the selected point along the time line. The user preferences can further include a classification criterion that comprises at least one of a theme, an age range, a media content rating, an actor or actress, or a title, represented in the user profile data.

Figure 14:
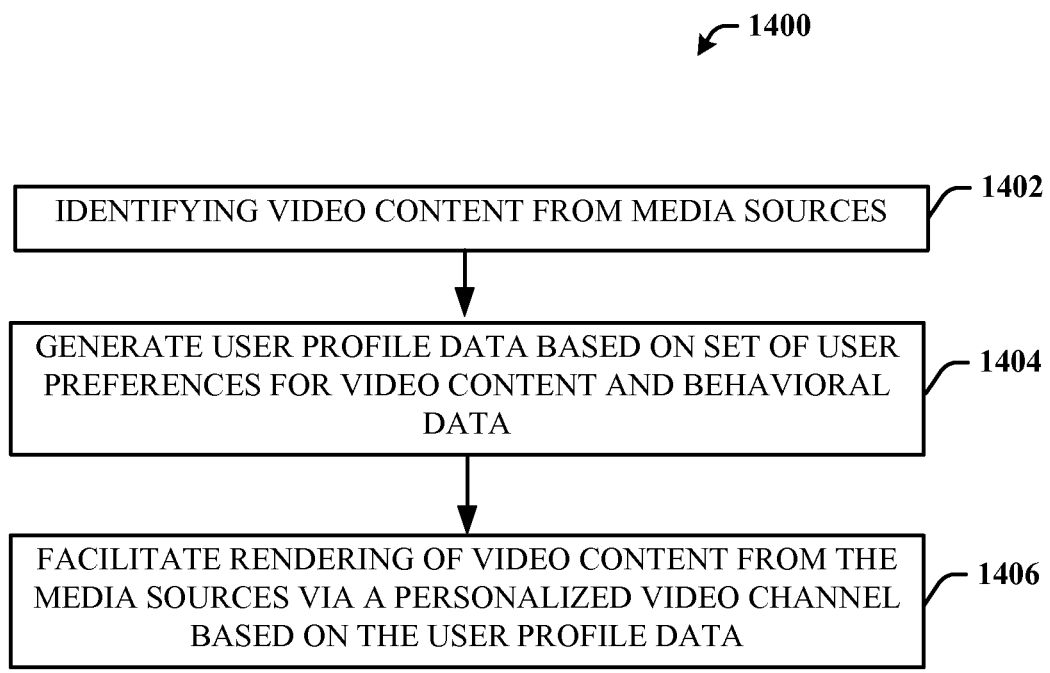
FIG. 14 illustrates another example of a flow diagram showing an exemplary non-limiting implementation for a system in accordance with various aspects described herein.

Referring to FIG. 14, illustrated is an exemplary system flow 1400 in accordance with embodiments described in this disclosure. The method 1400 identifies, by a system comprising at least one processor, video content at 1402 from media sources for generating, or communicating, the video content via a personalized video channel. For example, the media sources can comprise at least two of a broadcast media channel, a web page/site, a web data feed, a network subscription service, a social network feed, and/or a video library and the like. At 1404, user profile data is generated based on a set of user preferences for the video content and a set of behavioral data that represents user control inputs related to the video content. The user preferences could be a genre, an audio word or phrase within the content, a title, a language spoken, an actor/actress present, a time/date for rendering via the personalized channel, and the like. The user preferences can include a classification criterion, for example, that comprises at least one of a theme, an age range, a media content rating, an actor or actress, a title, which is associated with the video content, and whether audio content of a video content portion matches a word or phrase of a search criteria represented in the user profile data.

The behavioral data can include activities of the user for determining what the user could be interested in, such as purchases made of video content, search terms or criteria for video content, activities during viewing of video content (e.g., skipping content, fast forwarding, etc.), and any control input to video content in response to rendering the video content via a personalized channel.

At 1406, a rendering of the video content is facilitated from the media sources by a display component via the personalized video channel based on the user profile data. The channel is personalized for rendering content from various sources at different times and operable to interact with the content through sharing, publishing to other devices, rendering in a view pane, further configuration (e.g., altering source during a particular time, modifying the video content form a particular source, etc.). In addition or alternatively, a personalized channel selection can be received as profile data that determines whether the video content of a first personalized video channel or a different video content of a second personalized video channel is sent to the display component for rendering in a display component for viewing.

In one embodiment, the method can include comparing the video content from the media sources to identify duplicate video content, and removing the duplicate video content from a set of video content selections, in order to provide video content and/or media sources of the respective content as selections for configuring the personalized channel based on user profile data. The removal of duplicates could be according to one or more criteria, such as bit rate, resolution and/or other video quality criteria for maintaining the video content having a greater quality of service than the duplicate video content. For example, the method could include analyzing the video content from the media sources to determine one or more video characteristics, such as bitrate, frame rate, frame size, audio content, formatting, a title, an actor and/or actress, and/or metadata pertaining to the video content. The analysis of video content can operate to enable further removal of duplicate video content.

In another embodiment, the method 1400 can further include partitioning of the video content into a plurality of video content portions based on a defined set of criteria that comprises at least one of a topic, an audio content, a transition point in the video content, a duration or time frame, a match of the set of user preferences of the user profile data or the audio content of the video content being determined to match a word or phrase of a search criterion of the defined set of criteria. The portions can include, for example, various programming sequences being broadcast from one or more of the media sources, and/or of entire video content, in which the portions are splices of subsets of the video content in order to facilitate rendering of only interesting sections according to user profile data.

Figure 15:
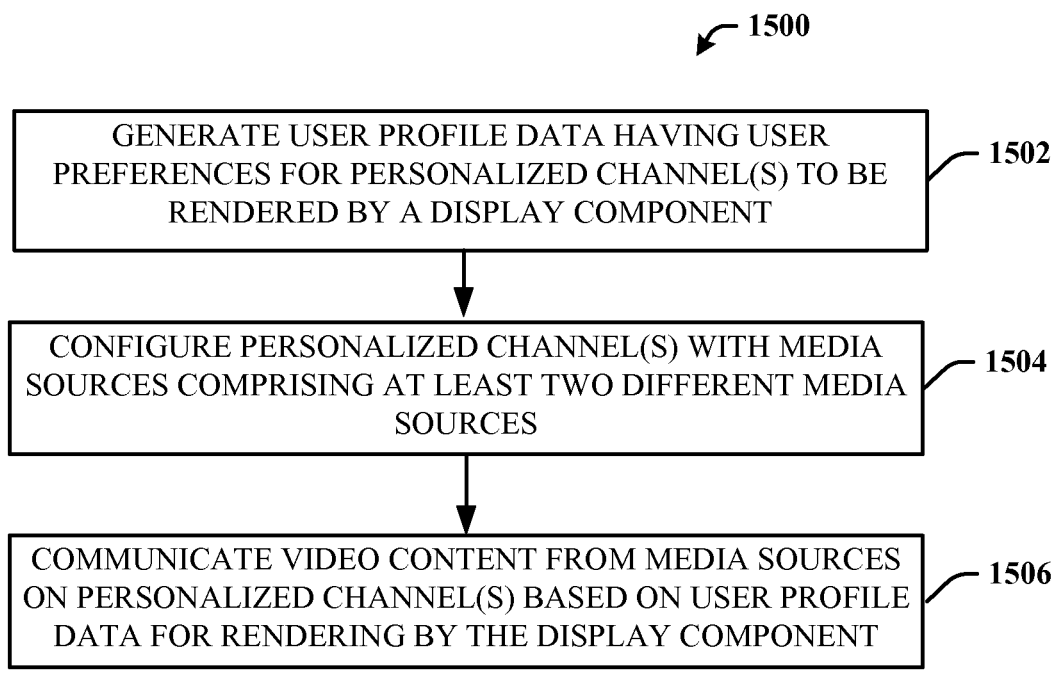
FIG. 15 illustrates another example of a flow diagram showing an exemplary non-limiting implementation for a system in accordance with various aspects described herein.

Referring to FIG. 15, illustrated is an exemplary system flow 1500 in accordance with embodiments described in this disclosure. The method 1500 generates user profile data having a set of user preferences for a set of personalized channels to be rendered by a display component. At 1504, the set of personalized channels is configured with media sources comprising at least two of a broadcast channel, a news data feed, a social data feed, a web site, a subscription broadcast service, a personal data store and/or the like. At 1506, video content is communicated from the media sources on the set of personalized channels based on the user profile data for rendering by the display component.

In one embodiment, configuring the set of personalized channels can include associating metadata with the video content or with at least one of the media sources from which the video content originate. The metadata can include information about the video content, a media source, and/or channel data (e.g., timing, scheduling, titles, etc.), in which the data can be associated from user preferences of the user profile data and/or manually associated with the video content and/or the media source. In addition, additional media sources can be added to the set of personalized channels as additional sources available are identified.

Exemplary Networked and Distributed Environments

One of ordinary skill in the art can appreciate that the various non-limiting embodiments of the shared systems and methods described herein can be implemented in connection with any computer or other client or server device, which can be deployed as part of a computer network or in a distributed computing environment, and can be connected to any kind of data store. In this regard, the various non-limiting embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the shared shopping mechanisms as described for various non-limiting embodiments of the subject disclosure.

Figure 16:
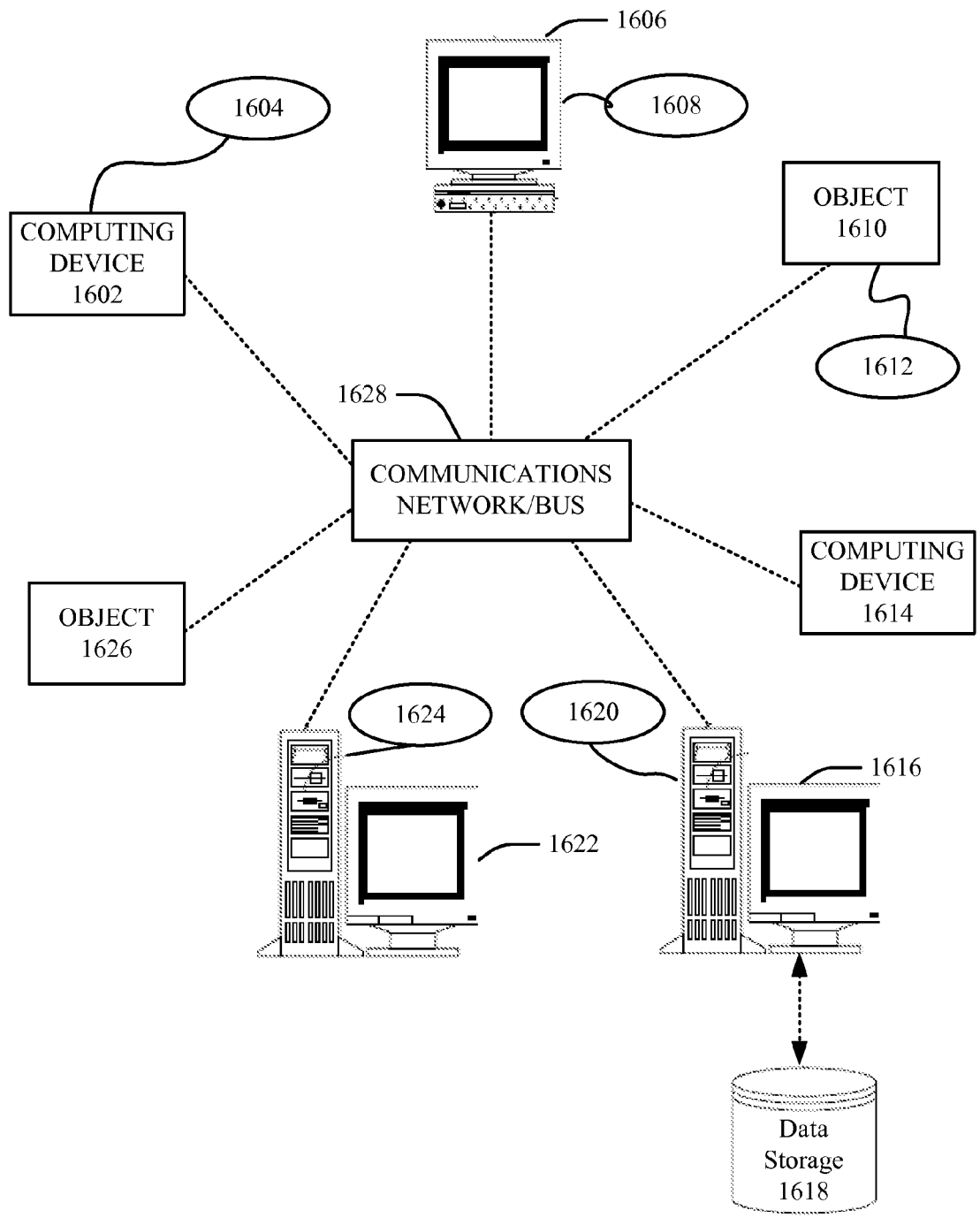
FIG. 16 is a block diagram representing exemplary non-limiting networked environments in which various non-limiting embodiments described herein can be implemented.

FIG. 16 provides a schematic diagram of an exemplary networked or distributed computing environment. The distributed computing environment comprises computing objects 1610, 1626, etc. and computing objects or devices 1602, 1606, 1610, 1614, etc., which may include programs, methods, data stores, programmable logic, etc., as represented by applications 1604, 1608, 1612, 1620, 1624. It can be appreciated that computing objects 1612, 1626, etc. and computing objects or devices 1602, 1606, 1610, 1614, etc. may comprise different devices, such as personal digital assistants (PDAs), audio/video devices, mobile phones, MP3 players, personal computers, laptops, etc.

Each computing object 1610, 1612, etc. and computing objects or devices 1620, 1622, 1624, 1626, etc. can communicate with one or more other computing objects 1610, 1612, etc. and computing objects or devices 1620, 1622, 1624, 1626, etc. by way of the communications network 1628, either directly or indirectly. Even though illustrated as a single element in FIG. 16, communications network 1628 may comprise other computing objects and computing devices that provide services to the system of FIG. 16, and/or may represent multiple interconnected networks, which are not shown. Each computing object 1610, 1626, etc. or computing object or device 1620, 1622, 1624, 1626, etc. can also contain an application, such as applications 1604, 1608, 1612, 1620, 1624, that might make use of an API, or other object, software, firmware and/or hardware, suitable for communication with or implementation of the shared shopping systems provided in accordance with various non-limiting embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the shared shopping systems as described in various non-limiting embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In client/server architecture, particularly a networked system, a client is usually a computer that accesses shared network resources provided by another computer, e.g., a server. In the illustration of FIG. 16, as a non-limiting example, computing objects or devices 1620, 1622, 1624, 1626, etc. can be thought of as clients and computing objects 1610, 1626, etc. can be thought of as servers where computing objects 1610, 1626, etc., acting as servers provide data services, such as receiving data from client computing objects or devices 1620, 1622, 1624, 1626, etc., storing of data, processing of data, transmitting data to client computing objects or devices 1620, 1622, 1624, 1626, 1628, etc., although any computer can be considered a client, a server, or both, depending on the circumstances. Any of these computing devices may be processing data, or requesting services or tasks that may implicate the shared shopping techniques as described herein for one or more non-limiting embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1640 or bus is the Internet, for example, the computing objects 1610, 1626, etc. can be Web servers with which other computing objects or devices 1620, 1622, 1624, 1626, etc. communicate via any of a number of known protocols, such as the hypertext transfer protocol (HTTP). Computing objects 1610, 1612, etc. acting as servers may also serve as clients, e.g., computing objects or devices 1620, 1622, 1624, 1626, etc., as may be characteristic of a distributed computing environment.

Exemplary Computing Device

As mentioned, advantageously, the techniques described herein can be applied to a number of various devices for employing the techniques and methods described herein. It is to be understood, therefore, that handheld, portable and other computing devices and computing objects of all kinds are contemplated for use in connection with the various non-limiting embodiments, i.e., anywhere that a device may wish to engage on behalf of a user or set of users. Accordingly, the below general purpose remote computer described below in FIG. 17 is but one example of a computing device.

Although not required, non-limiting embodiments can partly be implemented via an operating system, for use by a developer of services for a device or object, and/or included within application software that operates to perform one or more functional aspects of the various non-limiting embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 17:
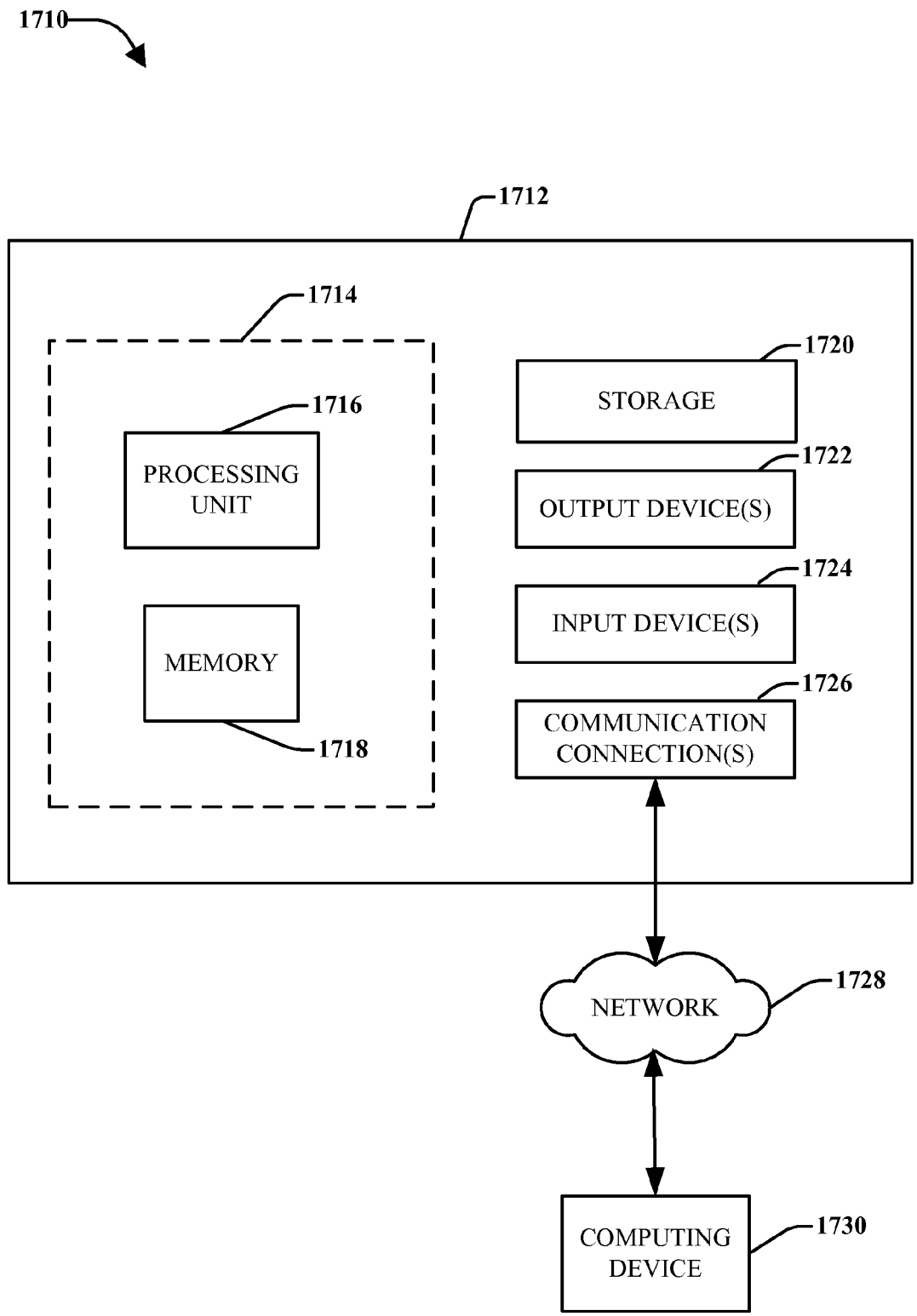
FIG. 17 is a block diagram representing an exemplary non-limiting computing system or operating environment in which one or more aspects of various non-limiting embodiments described herein can be implemented.

FIG. 17 and the following discussion provide a brief, general description of a suitable computing environment to implement embodiments of one or more of the provisions set forth herein. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 17 illustrates an example of a system 1710 comprising a computing device 1712 configured to implement one or more embodiments provided herein. In one configuration, computing device 1712 includes at least one processing unit 1716 and memory 1718. Depending on the exact configuration and type of computing device, memory 1718 may be volatile (such as RAM, for example), non-volatile (such as ROM, flash memory, etc., for example) or some combination of the two. This configuration is illustrated in FIG. 17 by dashed line 1714.

In other embodiments, device 1712 may include additional features and/or functionality. For example, device 1712 may also include additional storage (e.g., removable and/or non-removable) including, but not limited to, magnetic storage, optical storage, and the like. Such additional storage is illustrated in FIG. 17 by storage 1720. In one embodiment, computer readable instructions to implement one or more embodiments provided herein may be in storage 1720. Storage 1720 may also store other computer readable instructions to implement an operating system, an application program, and the like. Computer readable instructions may be loaded in memory 1718 for execution by processing unit 1716, for example.

The term "computer readable media" as used herein includes computer storage media. Computer storage media includes volatile and nonvolatile, removable and non-removable media implemented in any method or technology for storage of information such as computer readable instructions or other data. Memory 1718 and storage 1720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1712. Any such computer storage media may be part of device 1712.

Device 1712 may also include communication connection(s) 1726 that allows device 1712 to communicate with other devices. Communication connection(s) 1726 may include, but is not limited to, a modem, a Network Interface Card (NIC), an integrated network interface, a radio frequency transmitter/receiver, an infrared port, a USB connection, or other interfaces for connecting computing device 1712 to other computing devices. Communication connection(s) 1726 may include a wired connection or a wireless connection. Communication connection(s) 1726 may transmit and/or receive communication media.

The term "computer readable media" as used herein includes computer readable storage media and communication media. Computer readable storage media includes volatile and nonvolatile, removable and non-removable media implemented in any method or technology for storage of information such as computer readable instructions or other data. Memory 1718 and storage 1720 are examples of computer readable storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1712. Any such computer readable storage media may be part of device 1712.

Device 1712 may also include communication connection(s) 1726 that allows device 1712 to communicate with other devices. Communication connection(s) 1726 may include, but is not limited to, a modem, a Network Interface Card (NIC), an integrated network interface, a radio frequency transmitter/receiver, an infrared port, a USB connection, or other interfaces for connecting computing device 1712 to other computing devices. Communication connection(s) 1726 may include a wired connection or a wireless connection. Communication connection(s) 1726 may transmit and/or receive communication media.

The term "computer readable media" may also include communication media. Communication media typically embodies computer readable instructions or other data that may be communicated in a "modulated data signal" such as a carrier wave or other transport mechanism and includes any information delivery media. The term "modulated data signal" may include a signal that has one or more of its characteristics set or changed in such a manner as to encode information in the signal.

Device 1712 may include input device(s) 1724 such as keyboard, mouse, pen, voice input device, touch input device, infrared cameras, video input devices, and/or any other input device. Output device(s) 1722 such as one or more displays, speakers, printers, and/or any other output device may also be included in device 1712. Input device(s) 1724 and output device(s) 1722 may be connected to device 1712 via a wired connection, wireless connection, or any combination thereof. In one embodiment, an input device or an output device from another computing device may be used as input device(s) 1724 or output device(s) 1722 for computing device 1712.

Components of computing device 1712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1712 may be interconnected by a network. For example, memory 1718 may be comprised of multiple physical memory units located in different physical locations interconnected by a network.

Those skilled in the art will realize that storage devices utilized to store computer readable instructions may be distributed across a network. For example, a computing device 1730 accessible via network 1728 may store computer readable instructions to implement one or more embodiments provided herein. Computing device 1712 may access computing device 1730 and download a part or all of the computer readable instructions for execution.

Alternatively, computing device 1712 may download pieces of the computer readable instructions, as needed, or some instructions may be executed at computing device 1712 and some at computing device 1730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

The invention claimed is:

1. A system, comprising:
   a memory that stores computer-executable components; and
   a processor, communicatively coupled to the memory, that facilitates execution of the computer-executable components, the computer-executable components comprising:
      a source component configured to identify media content from a plurality of media sources to communicate the media content from the plurality of media sources at different times respectively via a media channel;
      a profile component configured to determine user profile data that includes user preferences associated with a first client device for the media content and the plurality of media sources;
      a control component configured to generate a set of viewing controls associated with the user preferences that define a timed duration to view the media content on a second client device via the media channel; and
      a streaming component configured to communicate the media content of the plurality of media sources to the second client device at the different times respectively via the media channel based on the set of viewing controls and the user preferences associated with the first client device.

2. The system of claim 1, wherein the control component is further configured to cancel the timed duration to view the media content on the second client device via the media channel based on a determination that an authorization control received by the control component corresponds to a defined authorization control associated with the first client device.

3. The system of claim 1, wherein the computer-executable components further comprise:
   an interaction component configured to interact with the second client device by an interactive mechanic that generates at least one of a voice, a video character or image, a text or a phrase via the media channel.

4. The system of claim 3, wherein the interaction component generates a notification of the timed duration to the second client device via the media channel.

5. The system of claim 3, wherein the interactive mechanic comprises at least one of a video game that generates an interaction with the second client device, a video image character that generates at least one of the voice, a video image, or a text via the media channel, or a symbol, and is configured to provide an indication that the timed duration is at an ending time for viewing via the media channel.

6. The system of claim 1, wherein the control component is further configured to associate the timed duration to the media channel for the second client device based on a set of sub-profile data of the user profile data.

7. The system of claim 6, wherein the set of sub-profile data comprises at least a part of the user preferences including at least one of a viewing time, an interactive mechanic preference, a set of blocked media sources or a set of blocked media content for the second client device.

8. The system of claim 1, wherein the computer-executable components further comprise:
a monitoring component configured to enable the first client device to access the media channel at a same time as the second client device is accessing the media channel.

9. The system of claim 8, wherein the monitoring component is further configured to initiate the streaming component to communicate the media content to the first client device and the second client device.

10. The system of claim 8, wherein the monitoring component is further configure to communicate a notification to the first client device indicating the media content being viewed via the media channel.

11. The system of claim 1, wherein the computer-executable components further comprise:
a notification component configured to communicate a notification that indicates at least one of a viewing duration, the media content communicated via the media channel or a media source of the media content, associated with a set of sub-profile data of the user profile data for the second device or a corresponding user authorization with the set of sub-profile data.

12. The system of claim 1, wherein the plurality of media sources comprise at least two of a wireless broadcast media channel, a web site, a web data feed, a wired broadcast channel, or a video library.

13. The system of claim 1, wherein the user profile data comprises a set of behavioral data representing user control inputs related to the media content that includes at least one of purchasing date, viewing data, search data, purchase data, location data, language data, age data, household membership data or subscription data.

14. The system of claim 1, wherein the set of user preferences of the user profile data comprise least one of a media source preference, a time preference to associate with the media content, a personalized channel selection, a theme preference, a rating preference, an actor preference, a language preference, or a date preference for the different times that the media channel communicates the media content.

15. The system of claim 1, wherein the computer-executable components further comprise:
a scheduling component configured to generate a schedule of media content from the plurality of media sources via the media channel based on the set of user preferences and the set of viewing controls, and to configure the media channel to communicate the media content from the plurality of media sources according to the schedule of media content.

16. The system of claim 1, wherein the computer-executable components further comprise:
a blocking component configured to block at least a part of the media content from the plurality of media sources based on at least one classification criterion comprising a title, a media source, a timed duration, a rating, a time, a date, or a genre.

17. The system of claim 1, wherein the computer-executable components further comprise:
a chat component configured to communicate a chat screen via the media channel to the first client device and at least the second client device receiving the media content via the media channel.

18. The system of claim 1, wherein the plurality of media sources further comprises a media store having a set of media content that is communicated via the media channel.

19. The system of claim 1, wherein the computer-executable components further comprise:
a publishing component configured to publish the media channel to a network for access by one or more authorized client devices.

20. The system of claim 1, wherein the computer-executable components further comprise:
an authorization component configured to provide access to the set of viewing controls and the user profile data, wherein the set of viewing controls comprise a timed duration control to define the timed duration, an interactive mechanic control to define an interactive mechanic to interact with the second user device, and a monitoring control to monitor a viewing of the media channel, wherein the set of viewing controls include a sub-set of the user profile data associated with second user profile data or the second user device.

21. A method, comprising:
identifying, by a system comprising at least one processor, media content from a plurality of media sources to communicate the media content from different media sources of the plurality of media sources at different times respectively via a media channel;
determining user profile data associated with a first device that comprises a set of user preferences for the media content and the plurality of media sources;
generating a set of viewing controls associated with the user profile data that establish an interval of time to view the media content on a second device via the media channel; and
streaming the media content via the media channel to the second device based on the user profile data associated with the first device and the set of viewing controls.

22. The method of claim 21, further comprising:
generating a schedule by which to communicate the media content of the different media sources at the different times via the media channel, wherein the different media sources comprise at least two of a wireless broadcast media channel, a web site, a web data feed, a wired broadcast channel, or a video library.

23. The method of claim 21, further comprising:
publishing the media channel to a network for access by at least the second device to view the media content.

24. The method of claim 21, further comprising:
providing access to the set of viewing controls and the user profile data, wherein the set of viewing controls comprise the interval of time, an interactive mechanic control to define an interactive mechanic that interacts with at least the second device while receiving the media content via the media channel, and a monitoring control to monitor a viewing of the media channel.

25. The method of claim 21, further comprising:
controlling the media channel with the set of user viewing controls from the first device to set the interval of time to view the media content on the second device.

26. The method of claim 21, further comprising:
controlling a viewing time associated with the interval of time for the second device.

27. The method of claim 21, further comprising:
interacting with an interactive mechanic that comprises at least one of a video game that generates an interaction with the second device viewing the media content via the media channel, a video image character that generates at least one of a voice, a video image, a text or a phrase via the media channel to the second device, or an symbol, to provide an indication of the interval of time.

28. The method of claim 21, further comprising:
monitoring the media channel to determine the media content or a media source of the plurality of media sources that is being communicated to the second device.

29. The method of claim 21, further comprising:
communicating a chat screen via the media channel to at least the second device.

30. The method of claim 21, further comprising:
blocking the media content from being communicated via the media channel based on at least one of a user device, a time, or a media source.

31. The method of claim 21, further comprising:
configuring the media channel to communicate the media content from the plurality of media sources at defined times based on user profile data that includes the set of user preferences and a set of behavioral data, wherein the set of user preferences comprise least one of a media source preference, a time preference to associate with the media content, a media channel selection, a theme preference, a rating preference, an actor preference, a language preference or a date preference, and the set of behavioral data comprises at least one of purchasing date, viewing data, search data, purchase data, location data, language data, age data, household membership data or subscription data.

32. A computer readable storage device comprising computer executable instructions that, in response to execution, cause a computing system comprising at least one processor to perform operations, comprising:
identifying media content from media sources comprising at least two of a wireless broadcast media channel, a web site, a web data feed, a wired broadcast channel, or a video library;
determining a set of user profile data associated with a first client device for configuring a media channel;
setting a set of viewing controls associated with a subset of user profile data of the set of user profile data that sets a limit and monitors viewing of the media content via the media channel at a second client device; and
configuring the media channel based on the set of user profile data to communicate the media content to the second client device at defined times based on the set of viewing controls and the user profile data associated with the first client device.

33. The computer readable storage device of claim 32, wherein the operations further comprise:
authenticating the second client device for viewing the media channel according to the limit that is set by the set of viewing controls.

34. The computer readable storage device of claim 33, the operations further comprising:
setting a timed duration to the media channel with the subset of user profile data; and
monitoring the media content communicated via the media channel that is associated with the subset of user profile data.

35. The computer readable storage device of claim 34, wherein the operations further comprise:
generating an interactive mechanic comprising a video image character that generates the at least one of a voice, a video image, a text or a phrase via the media channel to provide an indication of the timed duration set for the media channel.

36. The computer readable storage device of claim 35, wherein the operations further comprise:
configuring the media channel based on the set of user profile data to communicate the media content of different media sources at the defined times.

37. The computer readable storage device of claim 35, wherein the operations further comprise:
communicating a chat screen to at least a third client device and the second client device receiving the media content from the media sources via the media channel.

* * * * *